United States Patent
Lopez et al.

(10) Patent No.: US 10,904,885 B2
(45) Date of Patent: Jan. 26, 2021

(54) METHODS, NETWORK NODE AND WIRELESS COMMUNICATION DEVICE FOR HANDLING OF SIGNALS IN A WIRELESS COMMUNICATION NETWORK

(71) Applicant: Telefonaktiebolaget LM Ericsson (publ), Stockholm (SE)

(72) Inventors: Miguel Lopez, Solna (SE); Naveed Butt, Lund (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

(21) Appl. No.: 16/096,052

(22) PCT Filed: Jun. 3, 2016

(86) PCT No.: PCT/SE2016/050527
§ 371 (c)(1),
(2) Date: Oct. 24, 2018

(87) PCT Pub. No.: WO2017/209670
PCT Pub. Date: Dec. 7, 2017

(65) Prior Publication Data
US 2019/0132844 A1    May 2, 2019

(51) Int. Cl.
*H04W 72/04* (2009.01)
*H04L 1/00* (2006.01)
(Continued)

(52) U.S. Cl.
CPC .......... *H04W 72/0453* (2013.01); *H04L 1/00* (2013.01); *H04L 1/0003* (2013.01);
(Continued)

(58) Field of Classification Search
CPC ..... H04W 72/0453; H04W 4/70; H04W 4/80; H04L 1/00; H04L 1/0003; H04L 1/0009; H04L 1/0015; H04L 2001/0093
See application file for complete search history.

(56) References Cited

U.S. PATENT DOCUMENTS

| | | | |
|---|---|---|---|
| 6,510,147 B1 * | 1/2003 | Sun ....................... | H04B 1/707 370/209 |
| 2002/0155811 A1 * | 10/2002 | Prismantas .......... | H04B 1/1027 455/63.1 |

(Continued)

OTHER PUBLICATIONS

Deng, Der-Junn, et al., "IEEE 802.11ax: Next Generation Wireless Local Area Networks", 10th International Conference on Heterogeneous Networking for Quality, Reliability, Security and Robustness (QSHINE), 2014, pp. 1-6.

(Continued)

*Primary Examiner* — Alpus Hsu
*Assistant Examiner* — Camquyen Thai
(74) *Attorney, Agent, or Firm* — Sage Patent Group

(57) ABSTRACT

Disclosed is a network node and a method performed by a network node of a wireless communication network for wireless transmission of signals to wireless communication devices. The method comprises selecting adapted modulation and coding scheme, MCS, for a first signal to be transmitted to a first wireless communication device at first frequency bandwidth, the MCS being adapted to that second signal is to be transmitted to a second wireless communication device concurrently with the first signal, the second signal being transmitted at second frequency bandwidth that is subset of the first frequency bandwidth, the second frequency bandwidth being narrower than the first frequency bandwidth. The method comprises transmitting first signal to the first wireless communication device at first frequency bandwidth coded with adapted MCS, and transmitting the (Continued)

second signal to the second wireless communication device at second frequency bandwidth, the second signal being sent concurrently with the first signal.

14 Claims, 15 Drawing Sheets

(51) Int. Cl.
*H04W 4/70* (2018.01)
*H04W 4/80* (2018.01)

(52) U.S. Cl.
CPC .......... *H04L 1/0009* (2013.01); *H04L 1/0015* (2013.01); *H04L 2001/0093* (2013.01); *H04W 4/70* (2018.02); *H04W 4/80* (2018.02)

(56) References Cited

U.S. PATENT DOCUMENTS

| | | | | |
|---|---|---|---|---|
| 2010/0165956 | A1* | 7/2010 | Razzell | H04L 5/0094 370/338 |
| 2012/0224612 | A1 | 9/2012 | Kim et al. | |
| 2013/0077638 | A1* | 3/2013 | Kim | H04L 5/0066 370/462 |
| 2013/0229996 | A1 | 9/2013 | Wang et al. | |
| 2016/0057754 | A1 | 2/2016 | Azizi et al. | |
| 2016/0088665 | A1* | 3/2016 | Kim | H04W 74/008 370/329 |
| 2016/0278070 | A1* | 9/2016 | Patel | H04L 27/3461 |
| 2017/0141874 | A1* | 5/2017 | Di Taranto | H04L 5/0094 |
| 2018/0317173 | A1* | 11/2018 | Kim | H04W 52/02 |

OTHER PUBLICATIONS

Liu, Jianhan, et al., "Reliable Dual Sub-Carrier Modulations (DCM) for HE-SIG-B and Data", IEEE 802.11-15/1068r1, Sep. 12, 2015, pp. 1-25.

Shilo, Shimi, "11ax Support for loT—Requirements and Technological Implications", IEEE 802.11-15/1375, Nov. 11, 2015, pp. 1-24.

Supplementary European Search Report—16904182.9—dated May 3, 2019—5 Pages.

Broadcom Corporation: "Issue for a High Performance Unlicensed Spectrum Access Protocol for 5G", 3GPP TSG RAN 5G Workshop, Phoenix, AZ, Sep. 17-18, 2015, RWS-150045, Sep. 3, 2015, XP051017193, 7 Pages.

* cited by examiner

| L-STF | L-LTF | L-SIG | RL-SIG | HE-SIG A | HE-STF | HE-LTF | HE-Data |

| L-STF | L-LTF | L-SIG | RL-SIG | HE-SIG A | HE-STF | HE-LTF | LPLR-STF | LPLR-LTF | LRLP-SIG | LRLP Data |

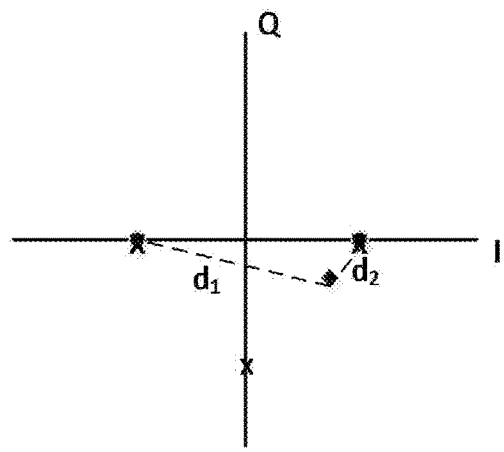

x: constellation points overlayed user

•: constellation points underlayed user

♦: noisy received signal, in frequency domain

Soft bit proportional to $|d_1-d_2|^2$
indicates high reliability

Fig. 17

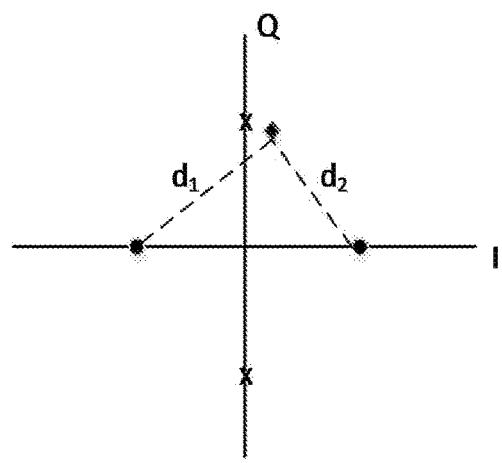

x: constellation points overlayed user

•: constellation points underlayed user

♦: noisy received signal, in frequency domain

Soft bit proportional to $|d_1-d_2|^2$
indicates low reliability

Fig. 18

METHODS, NETWORK NODE AND WIRELESS COMMUNICATION DEVICE FOR HANDLING OF SIGNALS IN A WIRELESS COMMUNICATION NETWORK

TECHNICAL FIELD

The present disclosure relates generally to methods, network nodes and wireless communication devices for handling of signals in a wireless communication network. More specifically, the disclosure relates to a network node and a method performed by a network node for wireless transmission of signals to wireless communication devices. The disclosure also relates to a wireless communication device and a method performed by a wireless communication device for wireless reception of signals from a network node.

BACKGROUND

In the wireless communication field, Internet of Things, IoT, is expected to increase the number of wirelessly connected communication devices significantly. A vast majority of these devices will likely operate in unlicensed frequency bands, in particular the 2.4 GHz industrial, scientific and medical, ISM, radio frequency bands. At the same time, there is increased demand for using the unlicensed frequency bands also for services that traditionally have been supported in licensed frequency bands. As an example of the latter, the third generation partnership project, 3GPP, that traditionally develops specifications only for licensed bands, has now also developed versions of Long Term Evolution, LTE, that will operate in the 5 GHz unlicensed band.

In addition, IEEE 802.11, which traditionally operates in unlicensed bands, is currently developing an amendment, 802.11ax, which supports new features that are usually supported only in licensed bands. Examples of such features are for instance Orthogonal Frequency Division Multiple Access, OFDMA, both for the Up-link, UL, and the down-link, DL.

Technologies that are expected to dominate for IoT-services are Bluetooth Wireless Technology, in particular Bluetooth Low Energy, BLE, and future versions of IEEE 802.11. With respect to IEEE 802.11, there are currently efforts to standardize a long range low power, LRLP, mode that at least to some extent builds upon the above mentioned 802.11ax.

IEEE document 802.11-15/1375 "11ax Support for IoT—Requirements and Technological Implications", by Shilo et al, Huawei, dated Nov. 11, 2015, suggests that it may be beneficial in an 802.11 OFDMA air interface for IoT to leave parts of the spectrum vacant for other technologies such as Bluetooth or Zigbee.

With a lot of wireless devices using the same band, and in addition using systems of different standards, coexistence between devices becomes an important aspect. A straight forward approach to obtain coexistence between devices using the same band but different systems is to ensure that if the devices are in the vicinity of one another, only one of the systems is active. This is essentially the approach taken when Bluetooth and IEEE 802.11 are integrated in the same chip-set. In general, this is a rather simple approach which is feasible when the different systems are integrated in the same device so that signaling between the two systems is simple.

With a LRLP mode that is at least partly based on IEEE 802.11ax, a straight forward approach to sharing one and the same channel is to simply use one of the different systems at a time. How large fraction of the time is used for respective system can then be adjusted based on the demands.

Although time sharing of one channel between two systems like 802.11ax and LRLP is simple, it may be far from optimal, especially since the LRLP system is expected to only use a bandwidth that is considerably smaller than what is used for 802.11ax. The issue that arises due to that the bandwidths are very different is that a considerable part of the channel will be unused when in LRLP mode, unless it would be possible to schedule a rather large number of LRLP devices on the same channel so that the same bandwidth as for 802.11ax is occupied.

SUMMARY

It is an object of the invention to address at least some of the problems and issues outlined above. It is an object of at least some of the embodiments of the present invention to efficiently use bandwidth of a channel that is to be used for transmission to wireless devices requiring different bandwidth. It is possible to achieve one or more of these objects and possibly others by using a method and an apparatus as defined in the attached claims.

According to one aspect, a method is provided that is performed by a network node of a wireless communication network for wireless transmission of signals to wireless communication devices. The method comprises selecting an adapted modulation and coding scheme, MCS, for a first signal to be transmitted to a first wireless communication device at a first frequency bandwidth, the MCS being adapted to that a second signal is to be transmitted to a second wireless communication device concurrently with the first signal, the second signal being transmitted at a second frequency bandwidth that is a subset of the first frequency bandwidth, the second frequency bandwidth being narrower than the first frequency bandwidth. The method further comprises transmitting the first signal to the first wireless communication device at the first frequency bandwidth using the adapted MCS, and transmitting the second signal to the second wireless communication device at the second frequency bandwidth, the second signal being sent concurrently with the first signal.

According to another aspect, a method is provided that is performed by a first wireless communication device of a wireless communication network for wireless reception of signals from a network node. The method comprises receiving, from the network node, an indication of an adapted MCS selected for a first signal to be transmitted to the first wireless communication device at a first frequency bandwidth, the MCS being adapted to that a second signal is to be transmitted by the network node to another wireless communication device concurrently with the first signal and at a second frequency bandwidth that is a subset of the first frequency bandwidth, the second frequency bandwidth being narrower than the first bandwidth. The method further comprises receiving, from the network node, an indication of the subset of the first bandwidth used for sending signals to the second wireless communication device, and receiving the first signal from the network node at the first frequency bandwidth using the adapted MCS.

According to another aspect, a network node is provided that is operable in a wireless communication system configured for wireless transmission of signals to wireless communication devices. The network node comprises a processor and a memory. The memory contains instructions executable by said processor, whereby the network node is operative for selecting an adapted MCS for a first signal to be transmitted to a first wireless communication device at a first frequency bandwidth, the MCS being adapted to that a second signal is to be transmitted to a second wireless communication device concurrently with the first signal, the second signal being transmitted at a second frequency bandwidth that is a subset of the first frequency bandwidth, the second frequency bandwidth being narrower than the first frequency bandwidth. The network node is further operative for transmitting the first signal to the first wireless communication device at the first frequency bandwidth coded with the adapted MCS, and transmitting the second signal to the second wireless communication device (130) at the second frequency bandwidth, the second signal being sent concurrently with the first signal.

According to another aspect, a first wireless communication device is provided that is operable in a wireless communication network configured for wireless reception of signals from a network node. The first communication device comprises a processor and a memory. The memory contains instructions executable by said processor, whereby the first communication device is operative for receiving, from the network node, an indication of an adapted MCS selected for a first signal to be transmitted to the first wireless communication device at a first frequency bandwidth, the MCS being adapted to that a second signal is to be transmitted by the network node to another wireless communication device concurrently with the first signal and at a second frequency bandwidth that is a subset of the first frequency bandwidth, the second frequency bandwidth being narrower than the first bandwidth. The first communication device is further operative for receiving, from the network node, an indication of the subset of the first bandwidth used for sending signals to the second wireless communication device, and receiving the first signal from the network node at the first frequency bandwidth coded with the adapted MCS.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIGS. 17-18 are x-y diagrams showing IQ plots of a signal in the frequency domain.

DETAILED DESCRIPTION

Briefly, a solution is described for transmitting a narrowband signal concurrently with a wideband signal on the same bandwidth in ways that effectively can be made transparent for the receiver of the wideband signal as well as the receiver of the narrowband signal. The ways this is achieved may involve some or no involvement from the receivers. To ensure that the system of the wideband signal and the system of the narrowband signal are impacted as little as possible, the effect the concurrent transmission has on the reception may be estimated at the transmitter side.

According to an embodiment, a network node transmits a first broadband signal on a first frequency bandwidth directed to a first wireless device. Concurrently, the network node transmits a second narrowband signal to a second wireless device on a second frequency bandwidth that occupies a part of the first frequency bandwidth. As this second signal occupies a part of the frequency bandwidth of the first signal, the first signal is transmitted with a more robust modulation and coding scheme, MCS, than it would have used if no second signal would have been sent concurrently with the first signal. The first signal is sent using an MCS that the receiver can use to decode the received signal albeit the loss of transmission capacity at the part of the first frequency bandwidth used for transmission of the second signal. In other words, the first signal is still sent on the first frequency bandwidth, it just uses a more robust MCS to compensate for that the second signal is transmitted concurrently. Hereby, the first frequency bandwidth is efficiently used at the same time as both the first and the second signal are correctly received with high probability.

Figure 1:
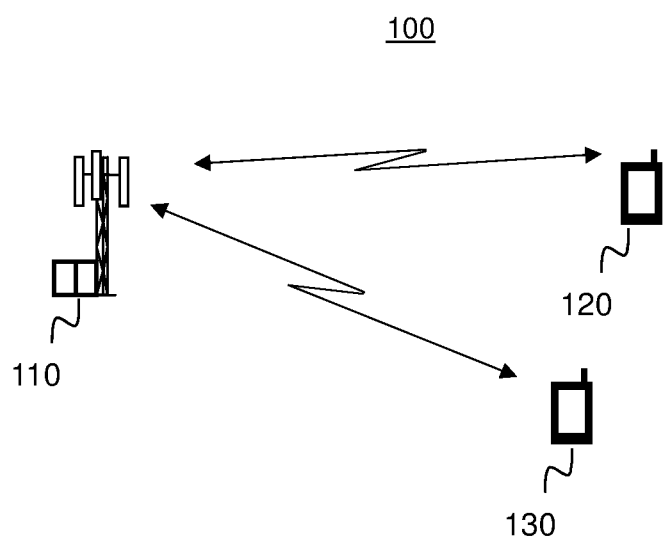
FIG. 1 is a block diagram of a communication scenario illustrating communication in a wireless communication network.

FIG. 1 describes a wireless communications network 100 comprising a network node 110. The network node 110 may be a base station, a radio base station, such as a nodeB or an eNodeB, or an access point, AP, a Remote Radio Unit, RRU, or a Remote Radio Head, RRH. FIG. 1 further describes a first wireless communication device 120 and a second wireless communication device 130, the wireless communication devices being configured for wireless communication with the base station 110. The wireless devices 120, 130 may e.g. be any kind of device arranged for wireless communication with the base station 110, such as a mobile phone, a Personal Digital Assistants, PDA, a sensor equipped with wireless communication abilities, a station, STA, a Laptop Mounted Equipment, LME, e.g. USB, Laptop Embedded Equipment, LEE, a Machine Type Communication, MTC, device, or Machine to Machine, M2M, device, etc. According to an embodiment, the first wireless device 120 is arranged to communicate over a broadband communication channel at a first frequency bandwidth, according to a broadband communication technology such as 802.11ax. Further, the second wireless device is arranged to communicate over a narrowband channel at a second frequency bandwidth, according to a narrowband communication technology such as LRLP. The second frequency bandwidth is a proper subset of the first frequency bandwidth. The second wireless device 130 is further arranged to communicate with the base station 110 concurrently with the first wireless device 120 communicating with the base station.

Figure 2:
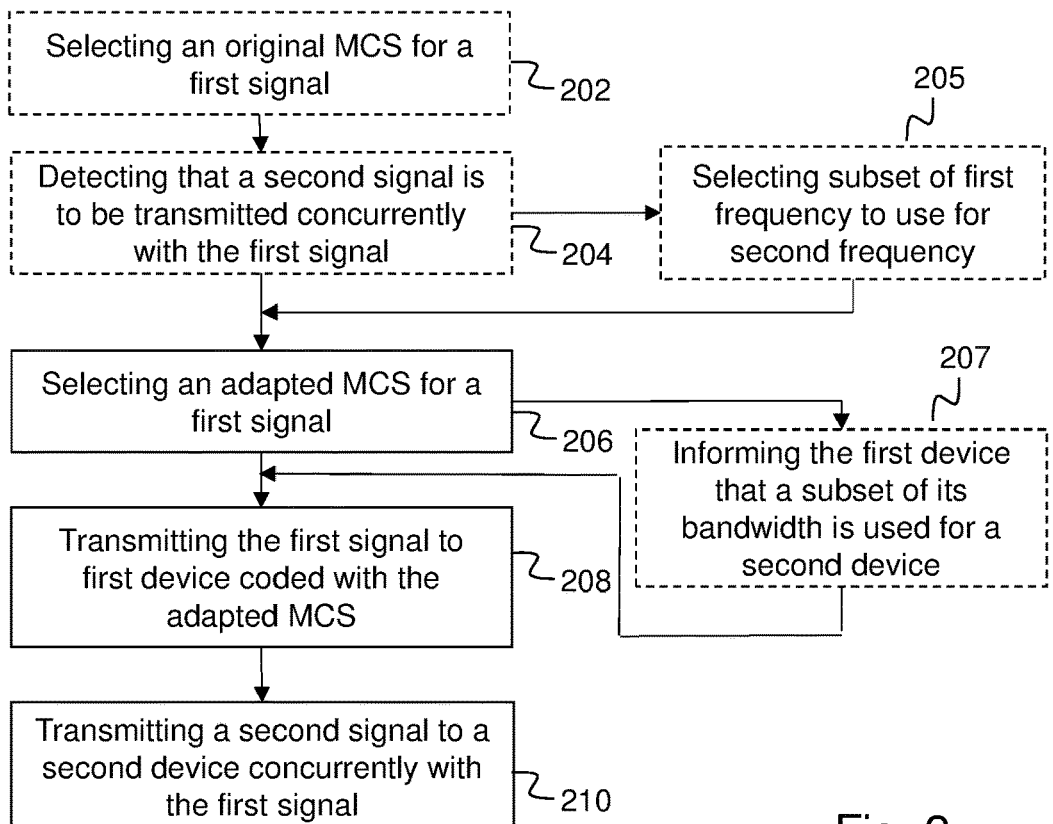
FIG. 2 is a flow chart illustrating a method performed by a network node, according to possible embodiments.

FIG. 2, in conjunction with FIG. 1, describes a method performed by a network node 110 of a wireless communication network 100 for wireless transmission of signals to wireless communication devices 120, 130. The method comprises selecting 206 an adapted MCS for a first signal to be transmitted to a first wireless communication device 120 at a first frequency bandwidth. The MCS is adapted based on that a second signal is to be transmitted to a second wireless communication device 130 concurrently with the first signal, and that the second signal is transmitted at a second frequency bandwidth that is a subset of the first frequency bandwidth, the second frequency bandwidth being narrower than the first frequency bandwidth. The method further comprises transmitting 208 the first signal to the first wireless communication device 120 at the first frequency bandwidth coded with the adapted MCS, and transmitting 210 the second signal to the second wireless communication device 130 at the second frequency bandwidth, the second signal being sent concurrently with the first signal.

The first signal may be an OFDM-signal. The adapted MCS selected for the first signal may be more robust than an original MCS that would have been selected when no second signal would have been transmitted or received concurrently with the first signal. The adapted MCS may be more robust than the original version by setting the channel code rate to a lower rate than what would have been used for the original version or by using a more robust modulation, e.g. a smaller modulation alphabet. The adapted MCS selected for the first signal is adapted not only to a wireless transmission link from the network node to the first wireless communication device but it also adapted to that the second signal is to be transmitted to the second mobile concurrently with the first signal at a subset of the first frequency band, i.e. that a part of the first frequency band is used for transmission to another wireless communication device. The second frequency bandwidth being a subset of the first frequency bandwidth may signify that the second frequency bandwidth is a proper subset of the first frequency bandwidth, e.g. that all the frequencies in the second frequency bandwidth are present in the first frequency bandwidth but that there are some frequencies in the first frequency bandwidth that are not present in the second frequency bandwidth. By selecting an MCS for transmission of the first signal that is adapted based on that a second signal is going to be transmitted from the network node concurrently with the first signal and at a frequency bandwidth that is a subset of the frequency bandwidth used for the first signal, an MCS can be selected that is more robust, taking into consideration that a part of the frequency band used for a broadband signal is actually going to be used by another signal. Consequently, an MCS may be selected that has a lower coding rate or modulation scheme and that hereby takes the loss of transmission capacity at the subset frequency into consideration. This means that the first signal may be coded as if the whole first bandwidth was used, e.g. it is not necessary to have different interleavers depending on if the first signal actually has the whole first bandwidth for itself or if a part of its bandwidth is used by a second signal directed to another wireless communication device. When the latter is the case, this is solved by using a more robust MCS for the same frequency bandwidth. It is to be noted that even though step 208 in the figure is before step 210, the steps may be initiated in this chronological order, or in opposite chronological order, or they may be initiated at the same time.

According to an embodiment, the network node has exactly one antenna for transmitting the first signal to the first wireless device. The network node further has exactly one antenna for transmitting the second signal to the second wireless device. In one embodiment of the invention the same antenna is used to simultaneously transmit both the first signal to the first wireless device, and the second signal to the second wireless device. According to another embodiment, the network node has several transmit antennas and uses delay diversity. In other words, each transmit antenna transmits the first signal and the second signal simultaneously, and there are relative delays between the transmissions of the different antennas. According to another embodiment, the wireless network 100 is an OFDMA-based network where the operating frequency band is divided into non-overlapping sub-bands and where the bandwidths used by the first wireless device and the second wireless device correspond to sub-bands.

According to an embodiment, the method may further comprise, before selecting the adapted MCS for the first signal, selecting 202 an original MCS for the first signal. Further, after selecting the original MCS, it is detected 204 that the second signal is to be transmitted to the second wireless communication device concurrently with the transmission of the first signal, then the selecting 206 of the adapted MCS for the first signal is performed in response to the detecting 204, the adapted MCS being more robust than the original MCS. Hereby, an original MCS selection method can be used and if it is detected that part of the frequency bandwidth intended for the first signal is used for another signal, a more robust MCS is selected that addresses the worse transmission conditions for the first signal. That the adapted MCS is more robust than the original MCS may signify that the adapted MCS has a lower coding rate and/or a more robust modulation scheme than the original MCS.

According to an embodiment, the method may further comprise selecting 205 the subset of the first frequency bandwidth to be used for the second frequency bandwidth based on signal strengths on sub-bandwidths of the first frequency bandwidth. The first frequency bandwidth comprises a plurality of adjacent sub-bandwidths that together make up the whole first bandwidth. The selected subset used for the second bandwidth may be the sub-bandwidth where the first bandwidth has its lowest average signal strength, or at least one of the sub-bandwidths having lower signal strength than an average signal strength of the first bandwidth. By selecting to transmit the second signal to the second wireless communication device at a sub-bandwidth of the first bandwidth based on signal strength of the sub-bandwidths of the first bandwidth, the throughput loss for the first signal strength can be minimized, or at least kept on a low level. The selecting 205 may be performed in response to the detecting that a second signal is to be transmitted concurrently with the first signal, and/or before the adapted MCS is selected for the first signal.

According to another embodiment, the method may further comprise sending 207 information to the first wireless communication device indicating that a subset of its bandwidth is used for sending signals to the second wireless communication device, including an indication of the used subset. Hereby, a demodulator of the first wireless communication device can disregard the information received at the subset of the first bandwidth, by for example nulling this part of the received signal. As a result, a signal with less interference is demodulated at the first device.

The boxes 202, 204, 205 and 207 of FIG. 2 being marked with dashed lines signifies that what is stated within each of them is optional in the method.

According to an embodiment, the first signal comprises a preamble portion and a data portion. Further, data of the second signal is overlaid over the data portion of the first signal at the subset of the first bandwidth corresponding to the second bandwidth. Data of the second signal is not overlaid over the preamble portion of the first signal. In an alternative, the second signal may also re-use at least part of the preamble portion of the first signal, at the second bandwidth.

According to another embodiment, the selection 206 of adapted MCS is based on a percentage of the first frequency bandwidth that the second frequency bandwidth occupies. By selecting adapted MCS for the first signal based on the percentage of the first signal bandwidth that the second signal occupies, it is possible to adapt the first signal with a suitably robust MCS so that the receiving node can decode the first signal. For example, if the second signal occupies 10% of the first bandwidth, a code rate should be selected that is 90% or less of the original code rate, or a modulation order that is at least 10% more robust, or a combination of lower code rate and more robust modulation order that in total gives at least 10% more robustness. When the MCS is 10% more robust, the signal can be received at 10% lower power. When the receiver can deal with 10% less power, it can handle a signal where 10% of the bandwidth is removed.

According to another embodiment, the first signal comprises a preamble portion and a data portion, and at least the data portion of the first signal is blanked at the subset of the first bandwidth corresponding to the second bandwidth. To blank at least the data portion of the first signal signifies to set the data bits of the data portion to zero. The data portion of the first signal is blanked at a sub-bandwidth of the first bandwidth, which is the same bandwidth range as the second bandwidth occupies. Hereby the second signal is protected from interference from the first signal. According to an embodiment, also parts or all of the preamble portion of the first signal is blanked at the sub-bandwidth of the first bandwidth corresponding to the second bandwidth.

According to another embodiment, at least one symbol of the subset of the first bandwidth corresponding to the second bandwidth is rotated before being transmitted. By such symbol rotation, the first wireless device, which is to receive the first signal, i.e. the broadband wireless device, will interpret the received symbol as noisy and put less weight on it in its decoder, which it should as it contains no information for the first wireless communication device. According to an embodiment, the symbols of the first signal at the sub-bandwidth corresponding to the second bandwidth are only rotated when both the first signal and the second signal employ BPSK or when both the first signal and the second signal employ QPSK as modulation scheme. When the first signal and the second signal employ BPSK, the at least one symbol may be rotated 90 degrees. When the first signal and the second signal employ QPSK, the at least one symbol may be rotated 45 degrees.

According to another embodiment, the first signal and the second signal are adapted to each other so that they have the same time duration. The first signal and the second signal may be adapted to each other so that they have the same number of bits, to achieve that they have the same time duration. The first signal and the second signal may be adapted to each other by padding, i.e. by adding zeros to the one of the first or second signal that is the shortest. The first and second signals are divided into packets or physical layer service data units, PSDUs, which are the units that are adapted so that they have the same time duration. The adaption of length of first signal to length of second signal is performed in the network node. Such a method is useful for bandwidth protection. Further, if the first wireless communication device and the second wireless communication device are to respond to the network node, such a characteristic may also be a means to ensure that they respond at the same time.

According to another embodiment, the method may further comprise sending, to the first wireless communication device, an indication of the adapted MCS selected for the first signal. Hereby, the first wireless communication device is informed of the adapted MCS used for coding the first signal and can use the adapted MCS when decoding the first signal.

Figure 3:
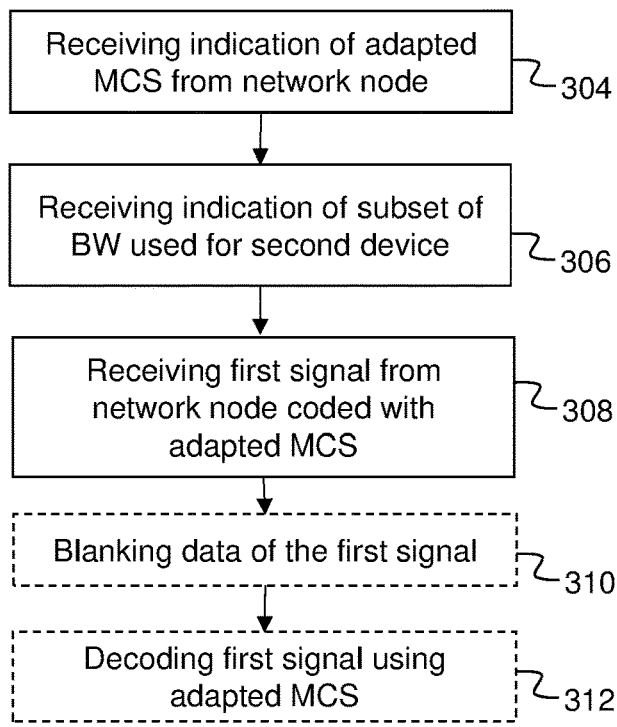
FIG. 3 is a flow chart illustrating a method performed by a wireless communication device, according to possible embodiments.

FIG. 3, in conjunction with FIG. 1, describes a method performed by a first wireless communication device 120 of a wireless communication network 100 for wireless reception of signals from a network node 110. The method comprises receiving 304, from the network node 110, an indication of an adapted modulation and coding scheme, MCS, selected for a first signal to be transmitted to the first wireless communication device 120 at a first frequency bandwidth, the MCS being adapted to that a second signal is to be transmitted by the network node to another wireless communication device 130 concurrently with the first signal and at a second frequency bandwidth that is a subset of the first frequency bandwidth, the second frequency bandwidth being narrower than the first bandwidth. The method further comprises receiving 306, from the network node, an indication of the subset of the first bandwidth used for sending signals to the second wireless communication device, and receiving 308 the first signal from the network node 110 at the first frequency bandwidth coded with the adapted MCS. By the first wireless communication device receiving an indication of the subset of the first bandwidth that is used by the network node for transmitting the second signal to the another wireless communication device concurrently, the first wireless communication device can treat the received first signal so that the influence on the first signal from the second signal at the subset of the first frequency is lowered, before decoding the first signal using the indicated adapted MCS. The first signal may be treated by blanking data received at the subset of the first bandwidth before decoding the first signal.

According to an embodiment, the method further comprises blanking 310 data of the received first signal at the subset of the first bandwidth, in response to the received indication of the subset, and decoding 312 the received, blanked first signal using the indicated adapted MCS.

Figure 4:
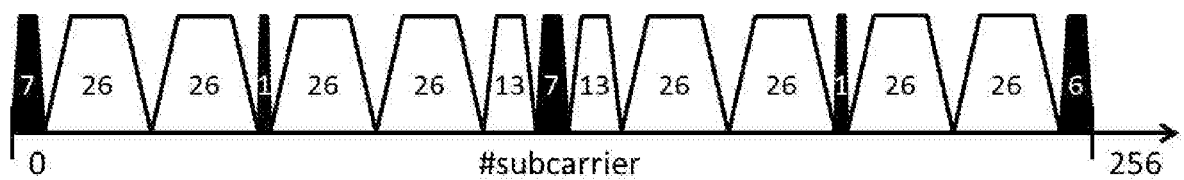
FIG. 4 is a diagram describing subcarriers of an OFDMA carrier.

In the following, an embodiment of the invention is described in the context of an IEEE 802.11-based wireless communication network, i.e. a Wireless Local Area Network based, WLAN-based network, using orthogonal frequency division multiplexing, OFDM. Further, as an example it is assumed that the nominal channel bandwidth is 20 MHz, that the signal is generated using a 256 point inverse fast Fourier transform, IFFT, so that the sub-carrier spacing becomes 20/256 MHz=78.125 kHz, and that the duration of one OFDMA symbol is 256/20 us=12.8 us, not including the cyclic prefix (CP). FIG. 4 shows the OFDMA structure of a carrier having 256 sub-carriers. The available bandwidth is divided into 9 resource units, RU. There are 8 RUs of 26 subcarriers plus one RU in the middle having two blocks, in total 26=13+13 sub-carriers again. As an example, the first user may be allocated the whole bandwidth, while the second user is allocated one RU, which is about ⅛$^{th}$ of the bandwidth allocated to the first user.

Figure 5A:
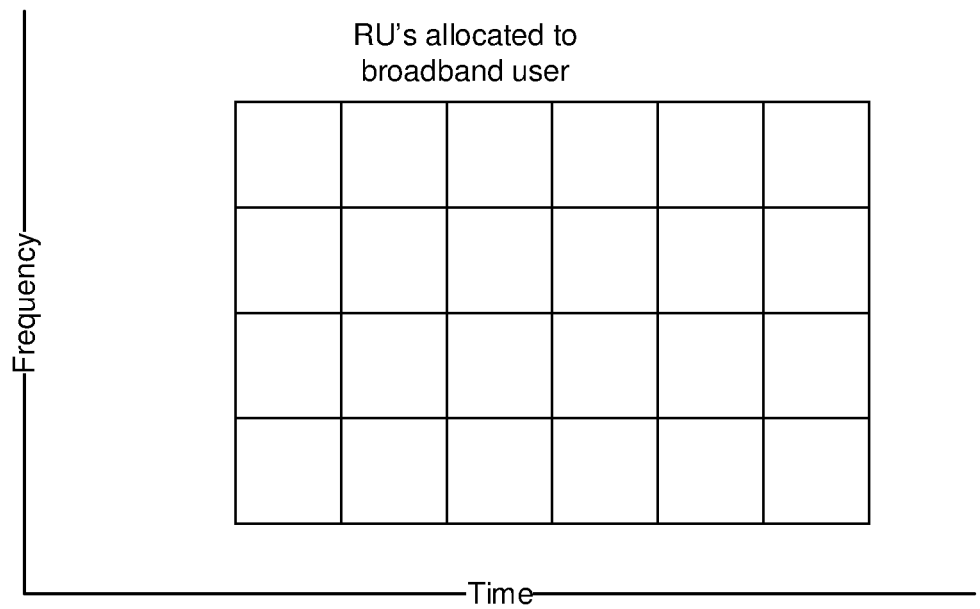
FIG. 5*a* is an x-y diagram illustrating resource unit allocation to a broadband user.
Figure 5B:
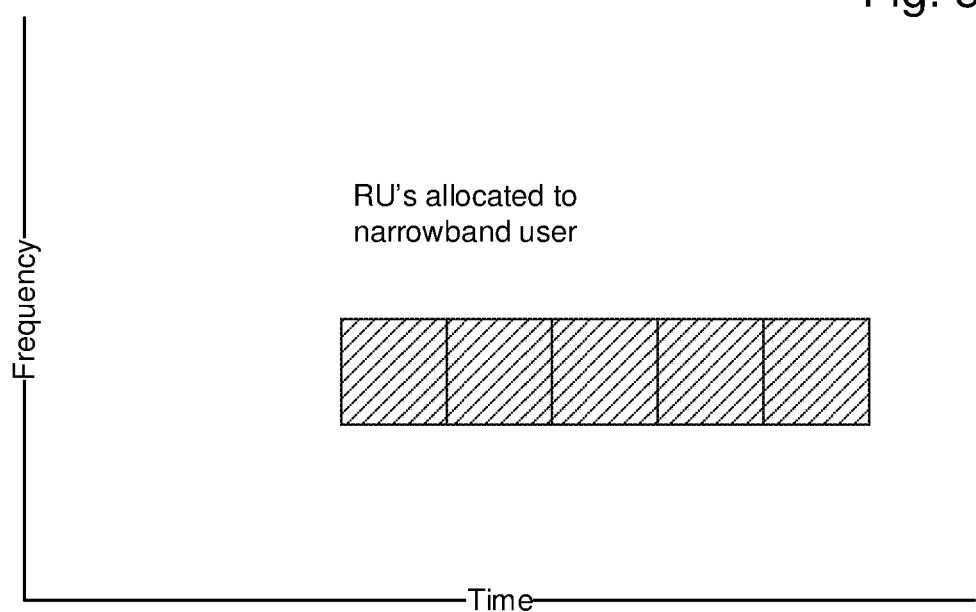
FIG. 5*b* is an x-y diagram illustrating resource unit allocation to a narrowband user.

The embodiment introduces an additional multiplexing mode for OFDMA systems, based on overlaying and blanking. As mentioned, there are instances where it is convenient to be able to transmit simultaneously to narrowband and broadband users within the same bandwidth. For example, assume that an access point, AP, has buffered data for one wireless broadband device, e.g. a mobile phone, supporting only 20 MHz, while a command must be sent to wireless narrowband device, e.g. a battery powered LRLP such as an actuator, supporting only one 2 MHz resource unit, RU. According to an embodiment, the two devices are served concurrently as follows. First, a 20 MHz band is allocated to the broadband device, as illustrated in the diagram of FIG. 5a, and one 2 MHz RU of the 20 MHz band is allocated to the narrowband device, as illustrated in the diagram of FIG. 5b.

Figure 6:
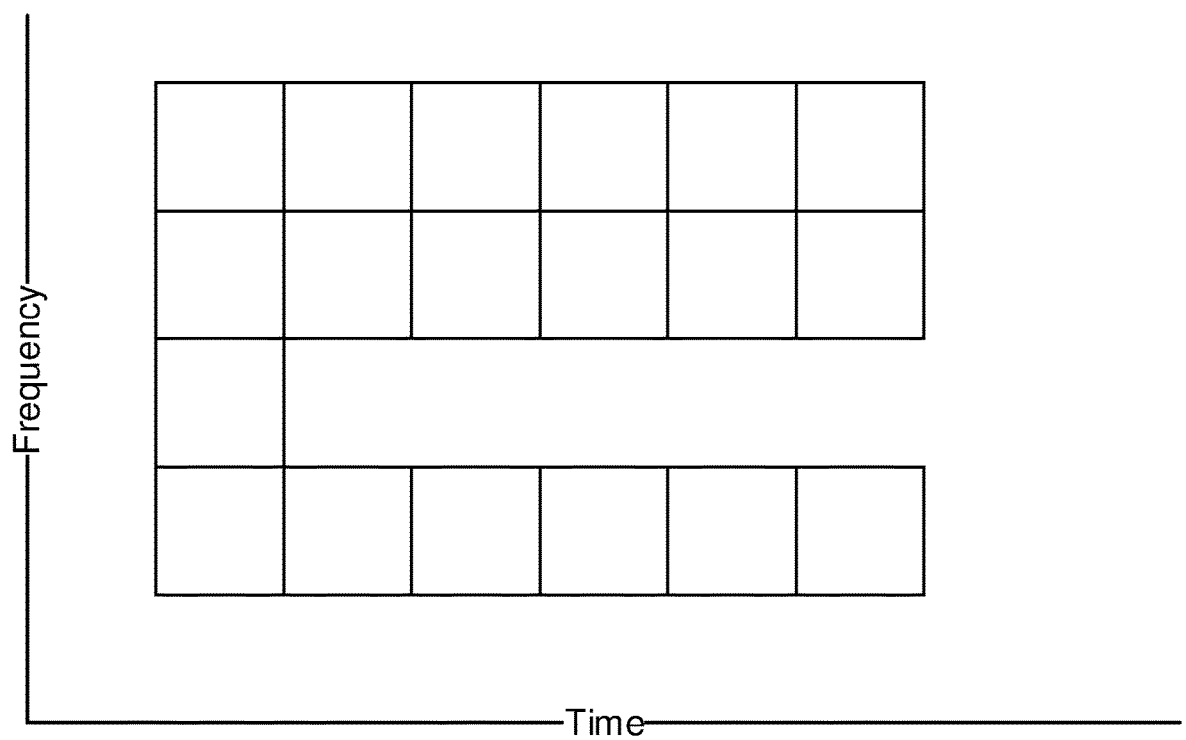
FIG. 6 is an x-y diagram illustrating blanking of selected RUs of the broadband user.
Figure 7:
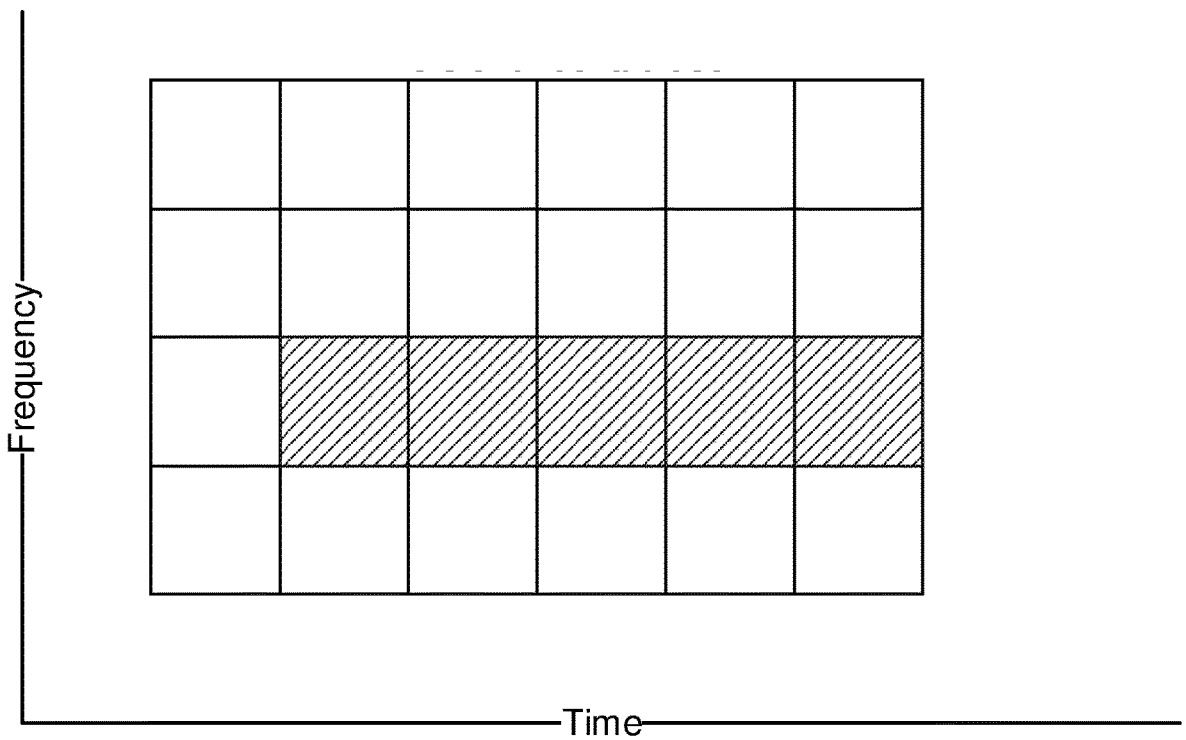
FIG. 7 is an x-y diagram illustrating overlaying a signal of the narrowband user onto the selected RUs of the broadband user.

However, in the process of assembling the packet and modulating the data for the broadband device, the sub-carriers in the sub-band corresponding to the RU allocated to the narrowband device, are blanked, as depicted in FIG. 6. At the same time, the transmission to the narrowband device is overlaid onto the transmission to the broadband device, as exemplified in FIG. 7. The squares that are striped are the time-frequency slots with the transmission to the narrowband device. This process takes place at a transmitter of the AP. The broadband device is called the underlaid user, while the narrowband device is called the overlaid user. The method can be extended to several underlaid and/or overlaid users.

It should here be noted that this way of combining the signal for two or more users is different than standard OFDMA, where the bandwidth is divided first. As described above, the underlaid user is coded as if the full bandwidth would be used. This simplifies the transmitter processing considerably, as e.g. there is no need to have different interleavers depending on what parts of the bandwidth is used. Also, at the receiver side, the processing may be simplified as there may be no need to read out control information regarding what part of the channel is allocated to a specific user. In fact, the receiver of the underlaid signal may be completely unaware of that the signal of an overlaid user is present. That there is an overlaid user present will naturally reduce the reliability of the underlaid user, but as this is known at the transmitter side this can be compensated for by using a more robust MCS. This is further described below.

Figure 8:
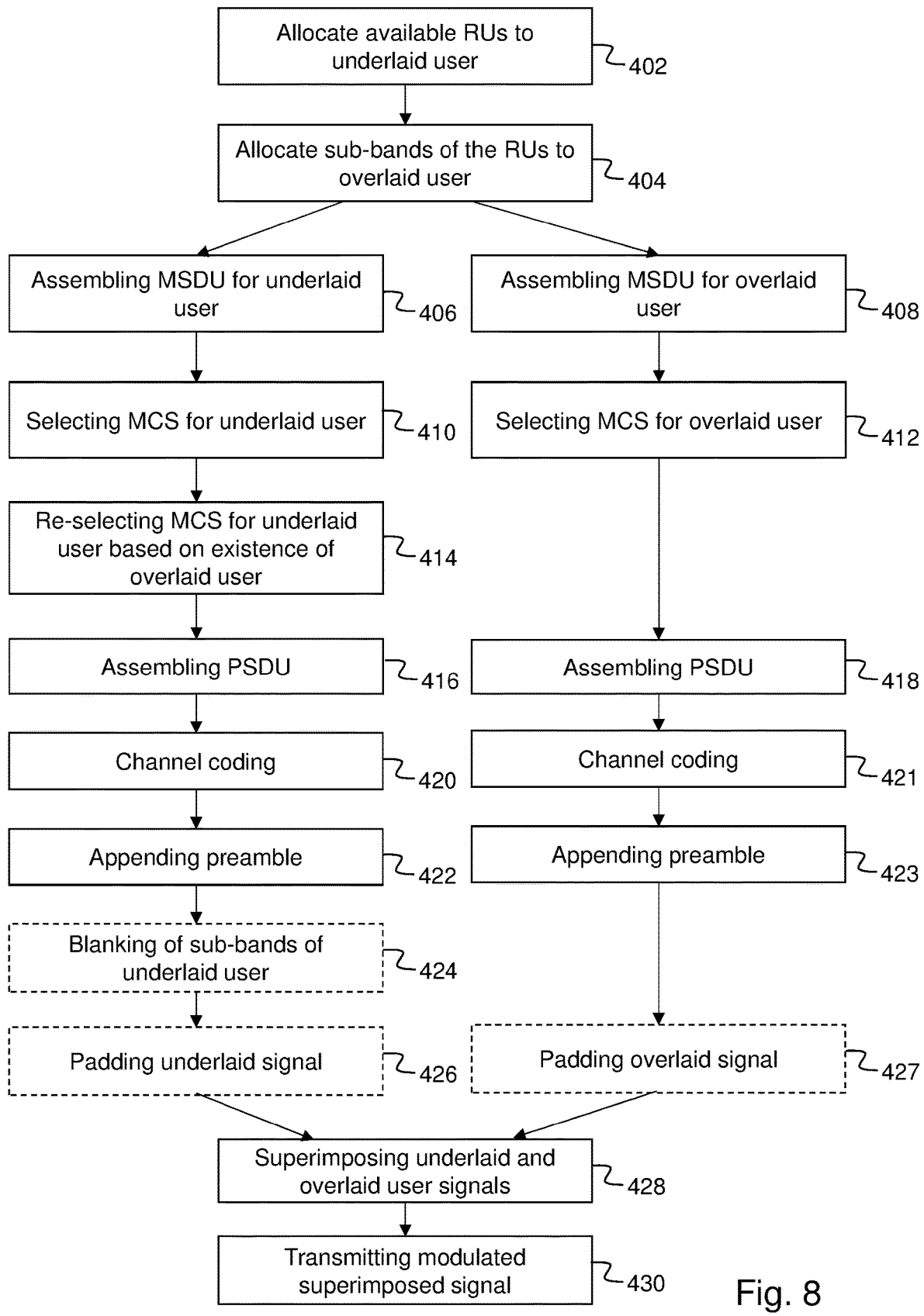
FIG. 8 is a flow chart of an overlaying method performed by an access point.

An embodiment of the overlaying method, showing the case of two users, one underlaid and one overlaid user, is illustrated by the flow diagram FIG. 8. The method of FIG. 8 is performed at the transmitter of the AP. First, available resource units, RUs, are allocated 402 to the underlaid (broadband) user. The RU's are allocated to the underlaid user as is usually done in OFDMA. The allocation is performed by an upper layer unit of the OSI-model, such as a function of the Logical Link Control, LLC, layer. If there are two or more underlaid users, then multiple access techniques commonly used in OFDMA are employed to assign RU's to the underlaid users. Note that the allocations correspond to non-overlapping bands in the frequency domain, and therefore when there are two or more underlaid users, the underlaid users are orthogonal among each other, in the frequency domain. Thereafter, sub-bands of the RU's allocated to the underlaid user are allocated 404 to the overlaid (narrowband) user. In case there are two or more overlaid users, these sub-bands are non-overlapping with each other. However, unlike the previous step, the sub-bands overlap with the RU's allocated to the underlaid user. Hence, overlaid users are orthogonal among each other, but they are not orthogonal to the underlaid users.

Hereinafter, the method as described in FIG. 8 is divided into two paths, the left part for treatment of data to be sent to the underlaid user and the right part for treatment of data to be sent to the overlaid user. First, following step 404, Medium Access Control, MAC, service data units, MSDUs, are assembled 406, 408, for the underlaid user and for the overlaid user. The MSDUs are sent to a function of the MAC layer for further processing. The MAC function performs link adaptation whereby it selects 410 the MCS for the underlaid user as well as selects 412 the MCS for the overlaid user. To select MCS may signify to select modulation order and code rate for each user. An example of an algorithm that may be used for selecting MCS is the Minstrel algorithm. Hereafter, the MCS for the underlaid user is re-selected 414 based on the existence of the overlaid user, e.g. by refining the link adaptation rate. Since the overlaid user is not orthogonal to the underlaid user, the latter will cause interference for the former, but not the other way around, at least not if blanking is applied. The MCS chosen in step 410 may not be appropriate when there are overlaid users, since the interference added by the overlaid user has not been taken into account when originally selecting 410 the MCS for the underlaid user. Typically, an MCS more robust than that selected in the previous step 410 is selected in the re-selecting step 414, for the underlaid user. Hereafter, for the underlaid user as well as for the overlaid user, the MAC function assembles 416, 418 Physical Layer Convergence Procedure, PLCP, service data units, PSDUs, and sends the PSDUs to a PHY (physical) layer function, including the MCS selected for each PSDU.

The PHY layer function performs channel coding, blanking, overlaying, packet formatting and packet transmission for the overlaid as well as the underlaid user. For the underlaid user as well as the overlaid user, the PSDUs for each user are modulated and channel coded 420, 421 according to the user-specific MCS selected in step 414 for the overlaid user and in step 412 for the underlaid user. Thereafter, preambles for the underlaid user as well as for the overlaid user, each including a PHY signaling field, are appended 422, 423 to the PSDUs. In an embodiment, different underlaid user may share a common multiuser preamble in OFDMA, while each overlaid user has its own single user preamble.

According to an embodiment, the sub-bands allocated to the overlaid user may be blanked 424 in the underlaid user's OFDM symbols. This can be accomplished, for example, by nulling or zeroing the constellation symbols belonging to the underlaid user whose allocated sub-carriers have also been allocated to the overlaid user. According to another embodiment, padding 426, 427 may be inserted in either the signal of the overlaid user or the signal of the underlaid user, in order to produce modulated signals of equal duration for both the underlaid user and the overlaid user.

The underlaid and overlaid user signals may then be OFDM modulated and additively superimposed 428 to each other into one signal to be transmitted. If the OFDM numerologies for the overlaid user and the underlaid user match, then this step can be accomplished with a single Inverse Fast Fourier Transformation, IFFT. Otherwise multiple IFFTs may be applied. However, the overlaid user signal may also not be OFDM modulated, e.g. it may be based on single carrier modulation. The modulated signal containing both data for the underlaid user and the overlaid user, is transmitted 430 wirelessly.

Some of the steps discussed in connection with FIG. 8 are now to be discussed in more detail.

Underlaying and Overlaying.

In an OFDMA system, the AP multiplexes users in orthogonal time-frequency radio resources. According to an embodiment, another task is added to the multiplexing functionality in the AP, namely to select users to overlay, select users to underlay, and to assign time-frequency resources to said users, which radio resources are non-orthogonal between underlaid user and overlaid user. A positive side effect of overlaying signals of an overlaid user, i.e. a narrowband device, onto signals of an underlaid user, i.e. a broadband device, is that the underlaid user offers bandwidth protection to the overlaid user. Users within the basic service set, BSS, and in neighboring BSSs will defer correctly to the underlaid user, thus decreasing the probability of collision. From this point of view, it is desirable to overlay signals of narrowband devices onto signals of broadband devices whenever there is just one, or possibly a few, narrowband devices having buffered data in the AP.

Frequency Selective Scheduling

Figures 9, 10:
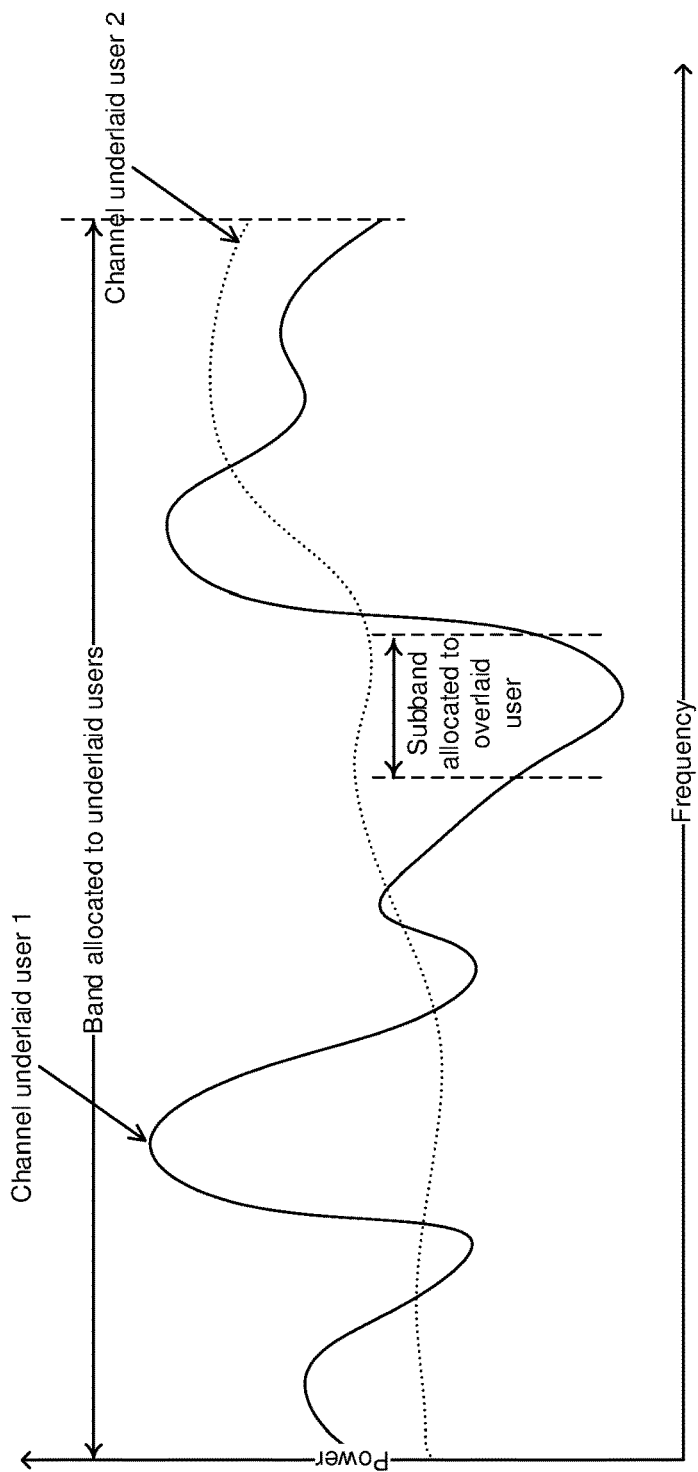
FIG. 9 is an x-y diagram with frequency on the x-axis and power on the y-axis.
FIG. 10 is block diagram of a packet format for 802.11ax according to prior art.

Sounding signals from the AP to the wireless devices, e.g. STAs, and feedback from the STAs to the AP may be available in some operation modes. If available, the multi-user overlaying functionality in the AP may take advantage of this information. FIG. 9 shows an example where the AP has estimates of the frequency domain characteristics of the channels for two underlaid users, denoted user 1 and user 2, respectively. The sub-band allocated to an overlaid user is also depicted. In this case, a scheduler in the AP chooses to underlay user 1 under the overlaid user, since this sub-carrier assignment minimizes the throughput loss due to blanking among the underlaid users. As can be seen in FIG. 9, user 1 has a power dip at a certain sub-frequency band. User 2 on the other hand has a rather even power distribution along the frequency band. Consequently, by selecting to overlay the overlaid user onto user 1, at the sub-frequency band where there is a power dip for user 1, the influence on the user 1 signal will be the lowest.

Another possibility for selecting frequency sub-bands in which to overlay the narrowband user signals onto the broadband user signals is to use the channel state information, if available at the AP. Referring to FIG. 9, given knowledge of the channel for user 1 and ignoring user 2, the AP could choose the indicated sub-band for an overlaid user, since it is the sub-band with the weakest sub-carriers and therefore the throughput loss for the underlaid user is minimized.

Preamble for Overlaid STA's

A single user 802.11ax packet, a so-called High Efficiency, HE, packet according to prior art is illustrated in FIG. 10, including preamble and data part. It may be necessary to adjust the packet format of the overlaid user so that the receiving STAs can detect and decode both the underlaid user packets and the overlaid user packets.

Figures 11, 12:
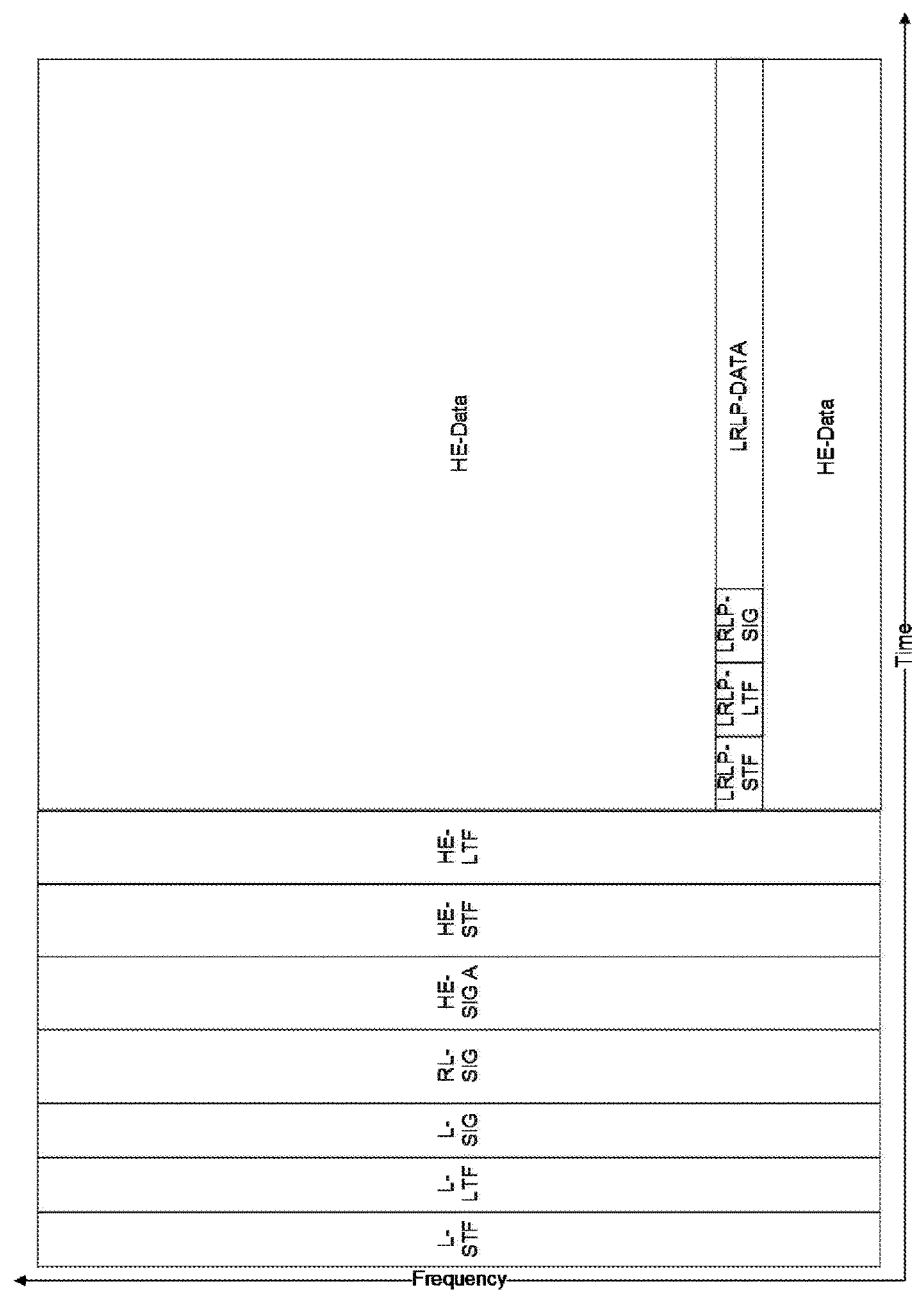
FIG. 11 is a block diagram of an embodiment of a packet format for an overlaid user.
FIGS. 12-16 are x-y diagrams with time on the x-axis and frequency on the y-axis, illustrating packet formats.

A solution according to an embodiment is to overlay the signal of the overlaid user over the data portion of the packet of the underlaid user, as exemplified in an embodiment of a packet format for an overlaid packet in FIG. 11. In this figure, the fields between (and including) Legacy Short Training Field, L-STF, to High Efficiency Long Training Field, HE-LTF, occupy a frequency band exceeding that of the other fields. This is also shown in the time frequency plot of FIG. 12. The preamble of the overlaid user could comprise the fields Long Range Low Power Short Training Field, LRLP-STF, LRLP-LTF and LRLP Signal Field, LRLP-SIG. The overlay user uses LRLP-STF and LRLP-LTF symbols for packet detection, Automatic Gain control, AGC, synchronization and/or channel estimation. As can be seen, the preamble of the overlaid user is only sent in the sub-frequency band allocated for the overlaid user, whereas the preamble of the underlaid user is sent in all frequency sub-bands of the broadband frequency band.

Figure 13:
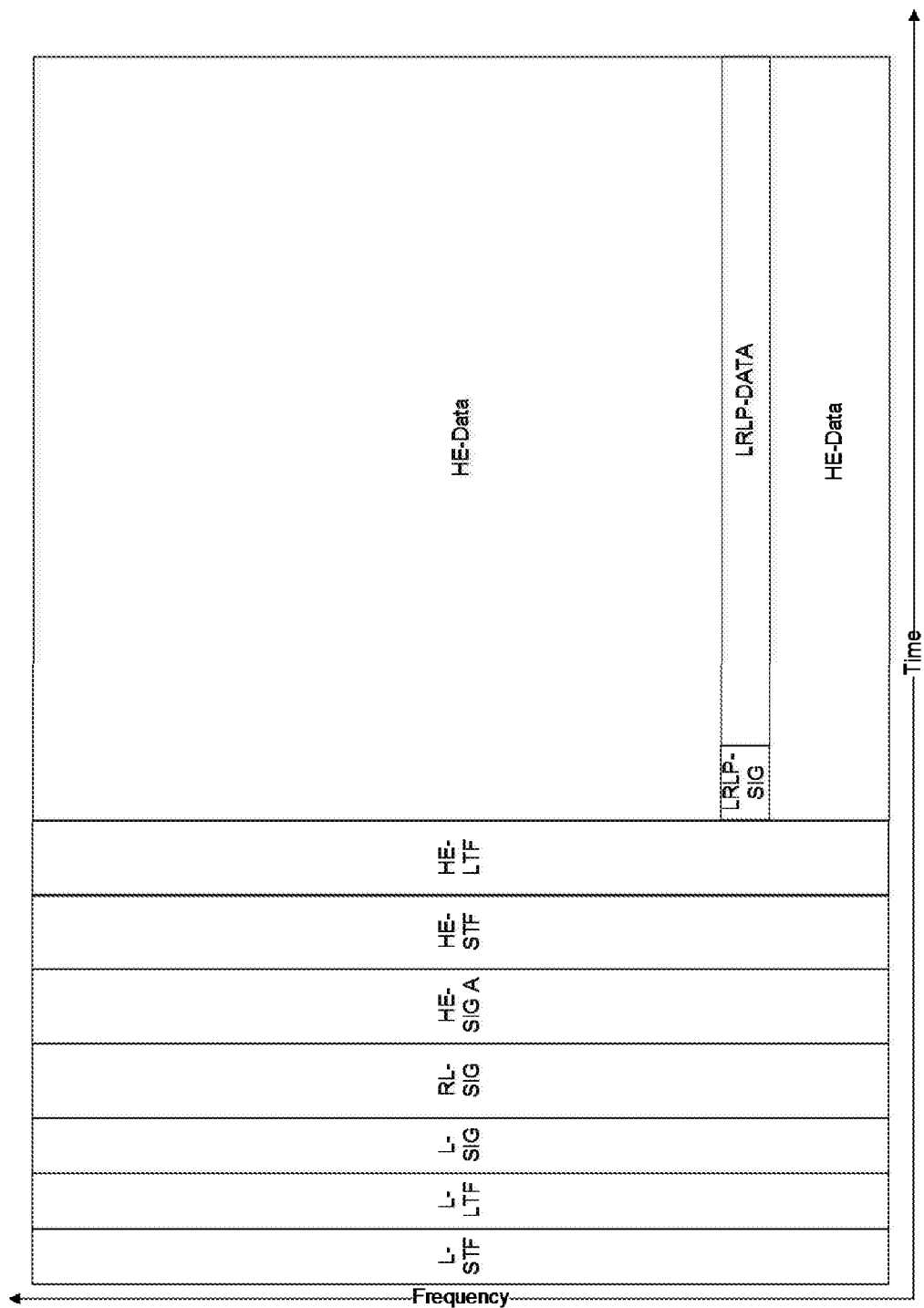

In another embodiment, the overlaid user may re-use the sub-bands of the preamble of the underlaid user in order to perform packet detection, AGC setting, synchronization and packet estimation, i.e. it may re-use the information in the HE-STF and HE-LTF of the underlaid user. This is illustrated in FIG. 13. In this case, the overlaid STA needs to be able to determine which sub-band of the preamble of the underlaid user it is receiving. This information can be conveyed by the AP in for example management frames, e.g. during association.

Link Adaptation and Rate Selection

In 802.11-like systems a link adaptation algorithm is used to select the MCS. An example is the Minstrel algorithm, commonly employed in commercially deployed WLAN systems. Once the link adaptation algorithm has selected the MCS for each underlaid user, the presence of overlaid users makes it necessary to refine the MCS selection. An example will be used to illustrate both the problem and the solution.

Suppose that the underlaid user has been allocated the full available bandwidth, e.g. 20 MHz, that the underlaid user needs to transmit a PSDU consisting of 1080 bytes, and that the link adaptation algorithm in the MAC has selected an MCS utilizing 64 Quadrature Amplitude Modulation, QAM, and code rate 5/6. In particular, 1080*6/5=1296 code bytes are deemed necessary for the successful decoding of the packet. Suppose also that the overlaid user has been allocated one RU that occupies ⅕th of the bandwidth allocated to the underlaid user, e.g. 1 RU comprising 26 subcarriers in an 802.11ax system. Hence, after blanking, only ⅘th of the original allocated bandwidth is available, so that the underlaid user only has 1080*(6/5)*(⅘)=1152 code bytes. Since at least 1152<1296, and 1296 code bytes are required at the receiver side, the selected MCS is not appropriate any more. Next, suppose that an MCS using 64QAM and code rates 3/4 and 2/3 are available. It can be readily seen that a code rate of 3/4 is not robust enough, since after blanking there would be 1080*4/3*⅘=1280 code bytes. However, using a code rate 2/3 would work at the receiver side, since in this case 1080*3/2*⅘=1440 code bytes are generated. Since 1440>1296, the receiver should be able to successfully decode the received packet if 64QAM and code rate 2/3 are selected.

In general, using an MCS with a lower constellation order and/or a lower code rate will make the transmitted signal more robust. Halving the constellation order typically results in 3 dB increased sensitivity. Thus, the combination of modulation order and code rate is used to obtain the desired overall coding gain that compensates for the coding loss due to blanking.

Blanking

Figure 14:
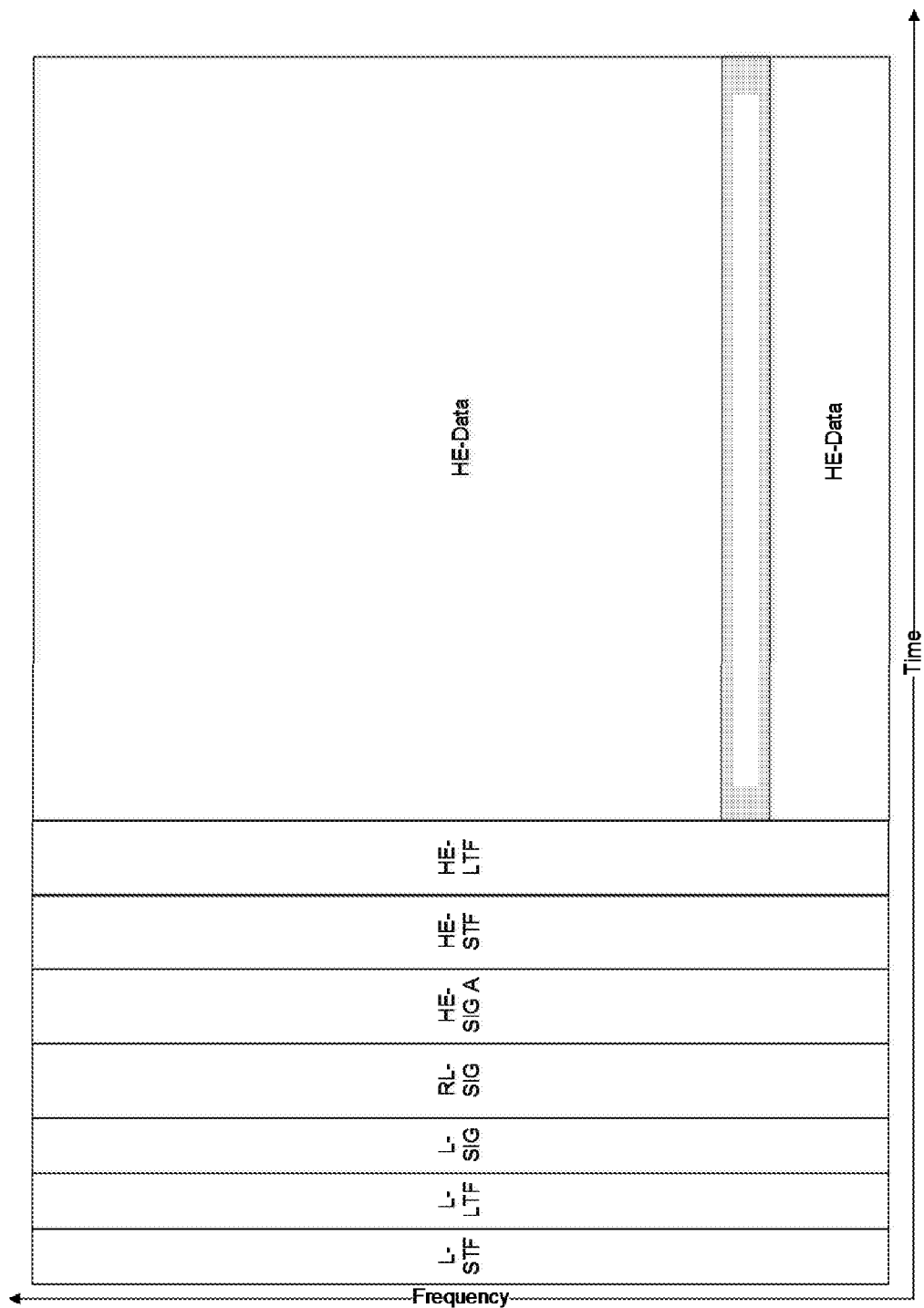

The term "blanking" refers to the procedure to null or zero selected subcarriers belonging to the underlaid users. Since there is no orthogonality among the underlaid user and the overlaid user, their frequency bands overlap. In order to protect the transmissions to overlaid users, some or all of the overlapping subcarriers belonging to the underlaid user are nulled. FIG. 14 gives an example with one overlaid user and one underlaid user. The radio resource allocations in the time-frequency plane are shown. The packet for the underlaid user follows an 802.11ax-like format, and consists of a preamble (consisting of L-STF, L-LTF, L-SIG, RL-SIG, HE-SIGA, HE-STF and HE-LTF) and data, labeled HE-DATA. The sub-band allocated to the overlaid used is shown by a partly dotted pattern. Note that in this example there is an overlap between the overlaid and underlaid users only over the underlaid data portion of the packet. There is no overlap over the preamble. The sub-carriers belonging to the underlaid user and corresponding to the dotted area, are blanked or nulled.

In another embodiment of the invention, the sub-carriers belonging to the underlaid stations are blanked also in the preamble portion of the packet. However, it is recommended to not employ blanking in the preamble since the information carried by the preamble is used also to protect the bandwidth from interference from legacy stations as well as other broadband stations. Therefore, blanking parts of the preamble may decrease the probability that legacy stations successfully decode the preamble, thereby increasing the probability that they would cause interference.

Blanking is optional. However, it is recommended as it protects the overlaid user from interference caused by the underlaid user. The underlaid user is more easily protected by means of robust channel coding, as indicated above.

Padding

It is unlikely that the payloads for both underlaid and overlaid users result in OFDM signals having exactly the same duration. It is desirable to pad the shortest signals by adding bits to it, for example by adding zeros at the end of the PSDU's, so that all the OFDM signals have the same length in time. The reason is that under Carrier Sense Multiple Access, CSMA, the access contention mechanism used in WLAN and other wireless systems, wireless devices contend for the medium by detecting either energy or valid packets. If padding is not used, then the probability of detection decreases. In other words, padding is useful for bandwidth protection and therefore recommended.

Figure 15:
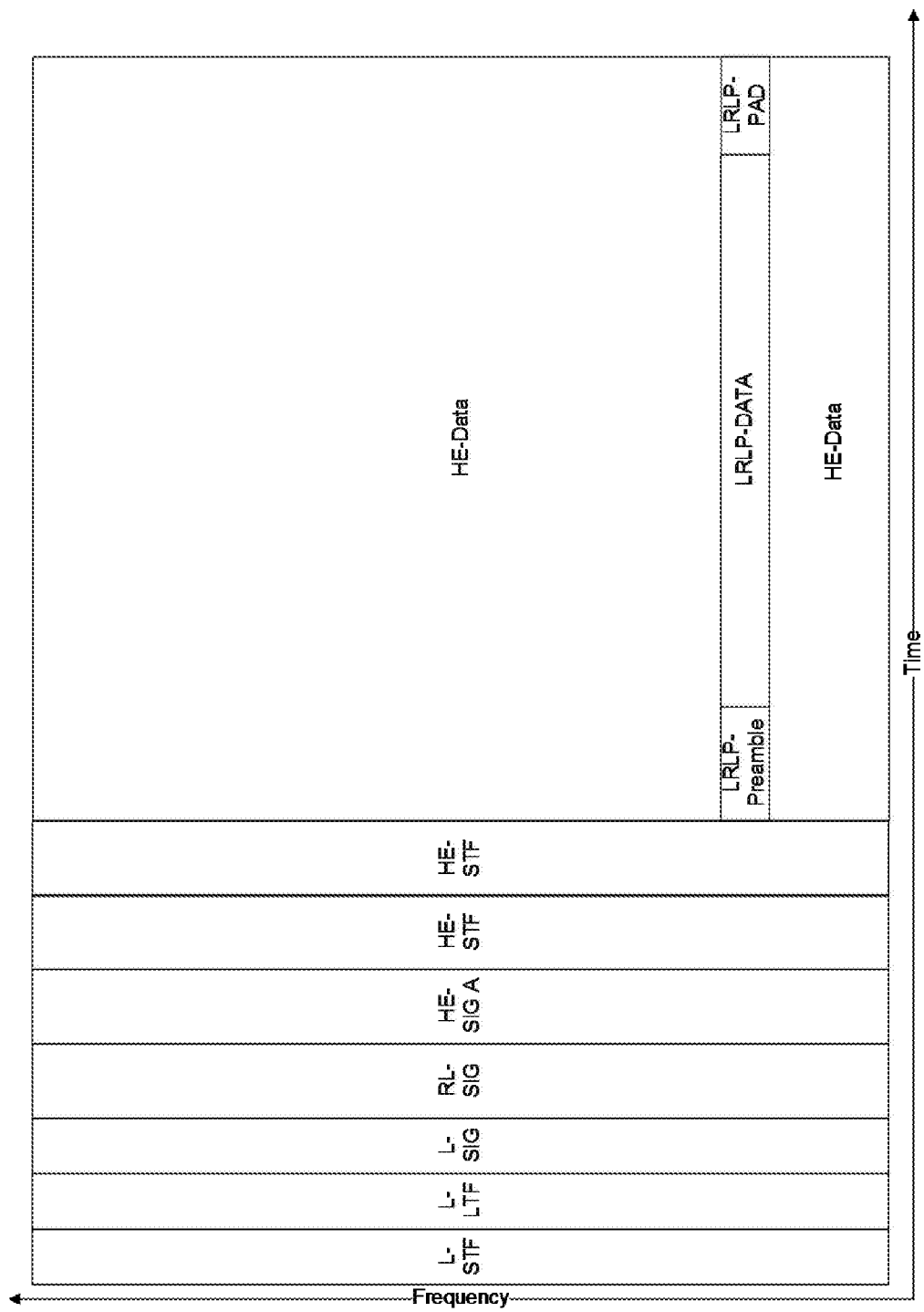
Figure 16:
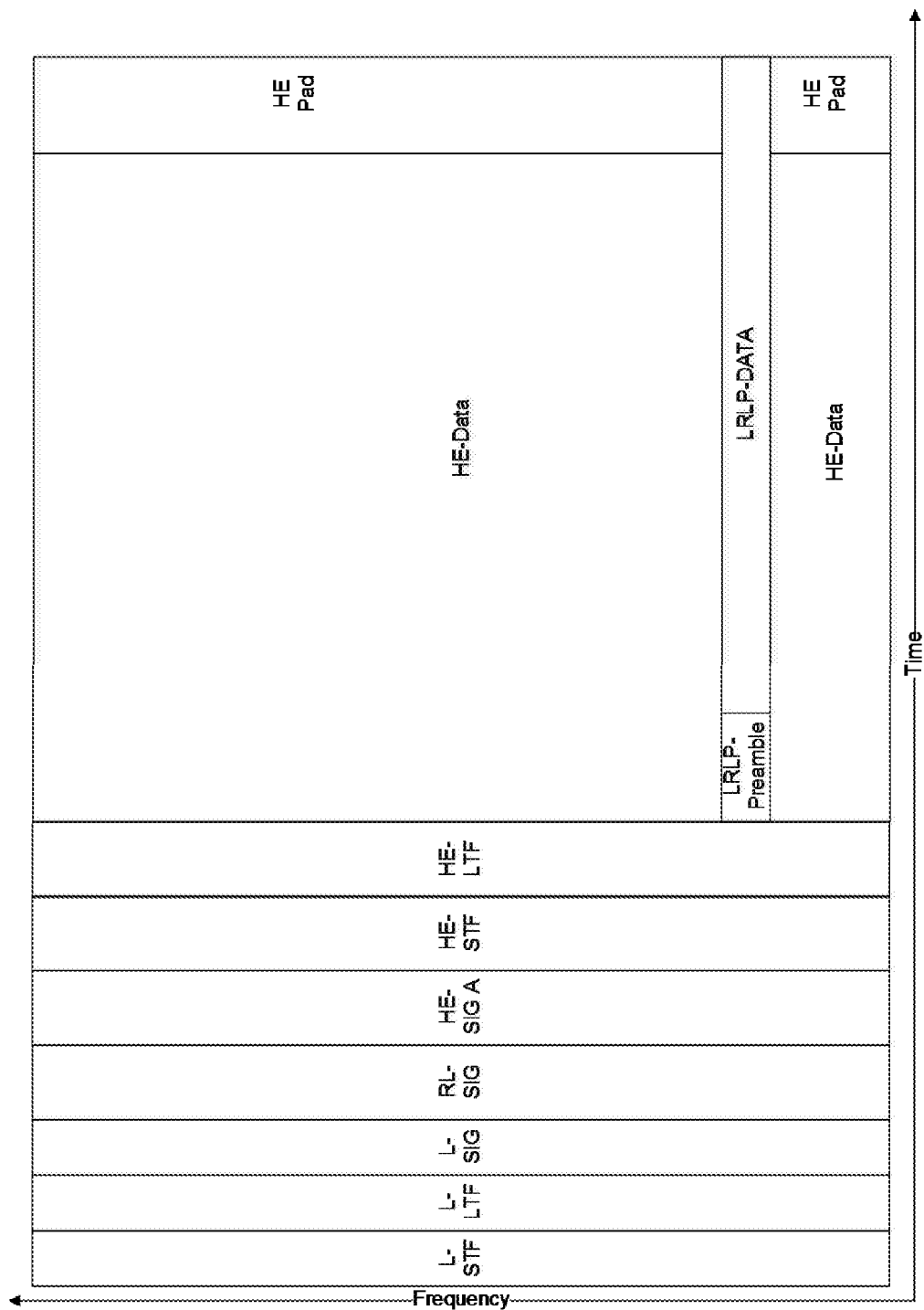

Padding is illustrated in FIG. 15 and FIG. 16. FIG. 15 illustrates how dummy bits are inserted at the end of the overlaid PSDU, as LRLP-PAD in the figure, and FIG. 16 illustrates how dummy bits are inserted at the end of the underlaid PSDU, as HE Pad, in order to achieve that all signals have the same duration.

Symbol Rotation for the Overlaid Users

When the mode of operation of the underlaid user is a transparent mode, the receiving underlaid user (i.e. the broadband STA) is not aware that there is overlaid data within its received bandwidth. If the underlaid user was aware, it would puncture the blanked bits. However, in this mode of operation, the underlaid user is unaware, and therefore will attempt to decode the data in the overlaid portion of the frequency band. If the overlaid and underlaid signals are generated using one IFFT, the receiving underlaid user will demodulate the blanked subcarrier and may assign high reliability to the overlaid bits. This is illustrated in FIG. 17, where an I-Q plot of the frequency-domain received signal is shown. In this figure, both underlaid and overlaid users employ Binary Phase Shift Keying, BPSK, constellations. The noisy received signal is shown by a diamond in the fig. It can be seen that the two constellations overlap. Therefore, the demodulator of the underlaid user assigns a high reliability to this bit, even though the bit is probably erroneous (this bit is directed to the overlaid user). The decoder performance will be degraded if the demodulator assigns high reliability to erroneous bits.

The current invention proposes to rotate the constellation for the overlaid user by an angle that is dependent on the symbol constellations chosen for both the underlaid and the overlaid user. The idea is illustrated in FIG. 18. In this figure, both the underlaid user and the overlaid user employ BPSK modulation. However, all the BPSK symbols belonging to the overlaid user have been rotated by 90 degrees. The noisy received signal is shown by a diamond, and it has been subjected to the same noise as the signal in FIG. 17. It can be seen that the demodulator for the underlaid signal will assign a low reliability to this bit, as the soft bit proportional to the absolute value of $d_1 - d_2$ of FIG. 18 has a low value and a low value for this soft bit indicates low reliability. Thus, the decoding performance of the underlaid user is boosted without affecting the link performance of the overlaid user.

The overlaid LRLP users typically employ robust modulations, e.g. BPSK or QPSK, while the underlaid user may also employ high order modulations such as 16QAM, 64QAM, or 256 QAM. According to embodiments, it may be applied a rotation angle to the constellation symbols belonging to the overlaid users according to the following rules.

If both underlaid user and overlaid user employ BPSK then rotate the constellation symbols of the overlaid user 90 degrees.

If both underlaid user and overlaid user employ QPSK then rotate the constellation symbols of the overlaid user 45 degrees.

In other cases, do not rotate the constellation symbols of the overlaid user.

The symbol rotation is imparted at the transmitter. It may be made transparent to the overlaid signal receiver, i.e. the overlaid user, if the rotation is imparted also to the preamble symbols used for synchronization and channel estimation. In this case there is no need to signal to the receiver that a rotation has been applied. Otherwise, the transmitter may signal to the receiver that a rotation has been imparted, for example by adding one or more signaling bits in the PHY header present in the preamble.

Receiver Processing

Figure 19:
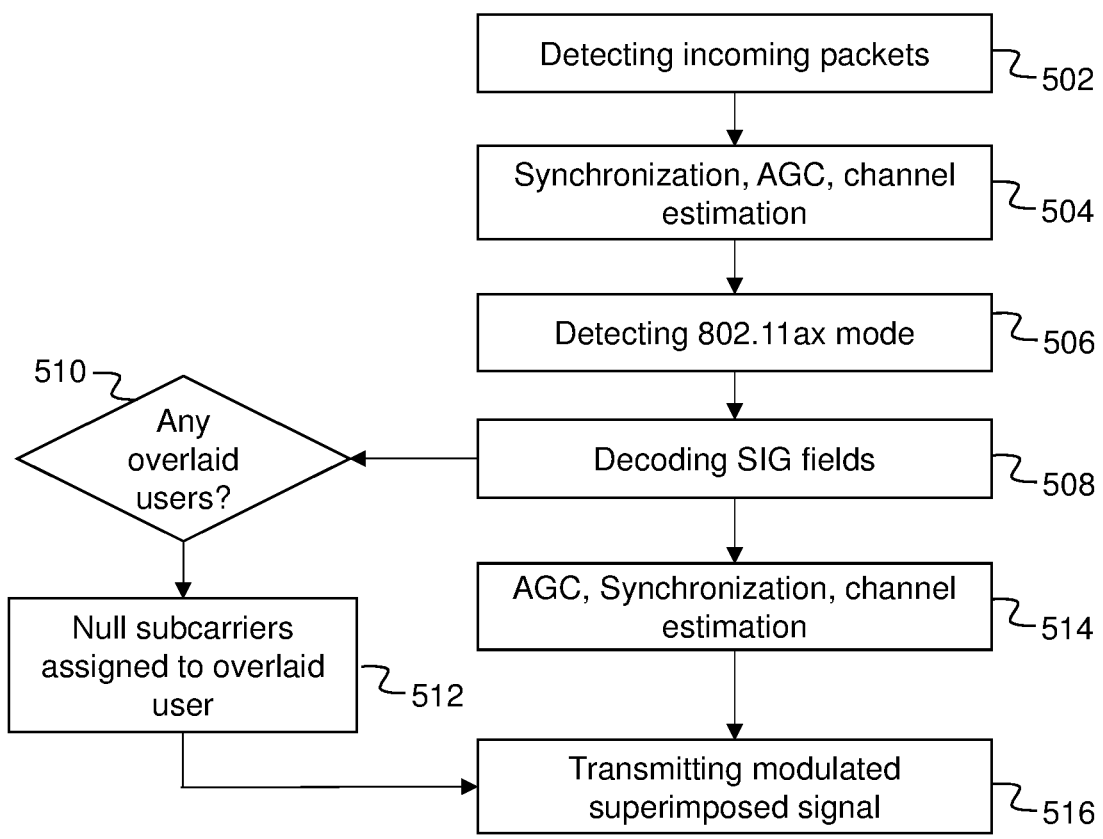
FIG. 19 is a flow chart describing processing at a receiving underlaid user.

In one embodiment of the invention, the underlaid user is not aware that there is an overlaid STA, called transparent operation mode for the underlaid user. In this case, the underlaid user, i.e. the underlaid STA operates as in prior art, decoding using information in the preamble of the received packet, e.g. in the HE-SIG field. In another embodiment, however, the AP signals to the underlaid user (broadband device), the presence of one or more overlaid users, and also indicates the sub-bands occupied by the overlaid users. This signaling may be contained in the packet preamble (PHY header) or may be signaled in management frames such as beacons or scheduling grants. In this case, the demodulator in the receiver of the underlaid user nulls the sub-carriers in the received signal that correspond to blanked subcarriers at the transmitter. This procedure is illustrated in a flow chart of FIG. 19 that describes the treatment of received packets at the receiver of the underlaid user. In FIG. 19, the receiver detects 502 the received packet. Thereafter, synchronization, AGC and channel estimation 504 is performed on the received packet. 802.11ax mode is detected 506 and SIG fields of the preamble is decoded 508. The signaling of presence of an overlaid user and the sub-bands occupied by the overlaid user is signaled in any of the SIG fields. If any of the SIG fields indicate that there are one or more overlaid users 510, the subcarriers assigned to the overlaid users are nulled 512. Then AGC, synchronization and channel estimation is performed 514 again on the rest of the signal that is not being nulled. Lastly, the data of the received packet with the nulled subcarrier is demodulated and user data is decoded 516. Alternatively, the demodulator may assign zero reliability to soft bits, also called soft values, corresponding to bits carried in blanked sub-carriers. The objective of this step is to ensure that the channel decoder functions appropriately and its performance is not degraded. Comparing to a prior art reception, the steps 512 and 514 are novel.

Even though the invention has been described in the context of downlink communication, it is as well applicable for uplink communication. In this case, the broadband device transmits the first signal at the first bandwidth and the narrowband device transmits the second signal concurrently with the first signal, and at the second bandwidth, which is a sub-bandwidth of the first bandwidth. The first and second signals are transmitted to the same network node.

Figure 20:
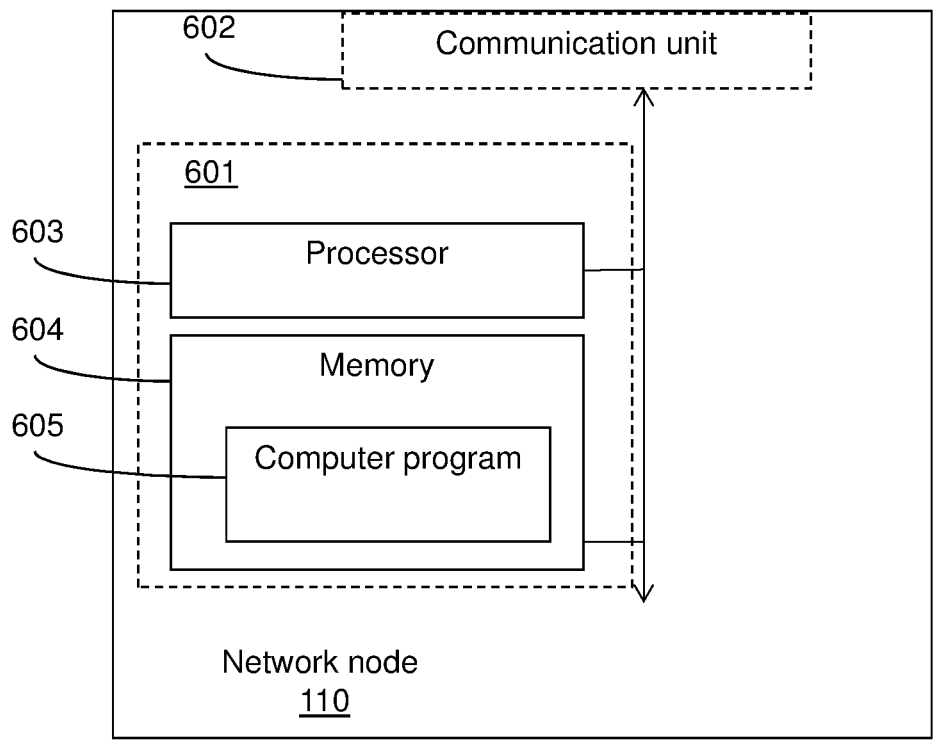
FIGS. 20-21 are block diagrams illustrating a network node in more detail, according to further possible embodiments.

FIG. 20, in conjunction with FIG. 1, describes a network node 110 operable in a wireless communication system 100 configured for wireless transmission of signals to wireless communication devices 120, 130. The network node 110 comprises a processor 603 and a memory 604. The memory contains instructions executable by said processor, whereby the network node 110 is operative for selecting an adapted MCS for a first signal to be transmitted to a first wireless communication device 120 at a first frequency bandwidth, the MCS being adapted to that a second signal is to be transmitted to a second wireless communication device 130 concurrently with the first signal, the second signal being transmitted at a second frequency bandwidth that is a subset of the first frequency bandwidth, the second frequency bandwidth being narrower than the first frequency bandwidth. The network node is further operative for transmitting the first signal to the first wireless communication device 120 at the first frequency bandwidth coded with the adapted MCS, and transmitting the second signal to the second wireless communication device 130 at the second frequency bandwidth, the second signal being sent concurrently with the first signal.

According to an embodiment, the network node 110 is further operative for, before selecting the adapted MCS for the first signal, selecting an original MCS for the first signal, and detecting that the second signal is to be transmitted to the second wireless communication device concurrently with the transmission of the first signal. Further, the network node is operative for selecting the adapted MCS for the first signal in response to the detecting, the adapted MCS being more robust than the original MCS.

According to another embodiment, the network node 110 is further operative for selecting the subset of the first frequency bandwidth to be used for the second frequency bandwidth based on signal strengths on sub-bandwidths of the first frequency bandwidth.

According to another embodiment, the network node 110 is further operative for sending information to the first wireless communication device indicating that a subset of its bandwidth is used for sending signals to the second wireless communication device, including an indication of the used subset.

According to another embodiment, the first signal comprises a preamble portion and a data portion, and data of the second signal is overlaid over the data portion of the first signal at the subset of the first bandwidth corresponding to the second bandwidth.

According to another embodiment, the network node 110 is operative for selecting the adapted MCS based on a percentage of the first frequency bandwidth that the second frequency bandwidth occupies.

According to another embodiment, the first signal comprises a preamble portion and a data portion, and the network node is operative for blanking at least the data portion of the first signal at the subset of the first bandwidth corresponding to the second bandwidth.

According to another embodiment, the network node 110 is further operative for rotating at least one symbol of the subset of the first bandwidth corresponding to the second bandwidth before transmitting.

According to another embodiment, the network node 110 is further operative for adapting the first signal and the second signal to each other so that they have the same time duration.

According to other embodiments, the network node 110 may further comprise a communication unit 602, which may be considered to comprise conventional means for communicating with wireless communication devices, such as a transmitter and a receiver, or a transceiver, arranged for wireless communication. The communication unit 602 may further be arranged for communication with other nodes of the communication network 600, such as other radio access network nodes or core network nodes, probably via wireline. The instructions executable by said processor 603 may be arranged as a computer program 605 stored e.g. in said memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may comprise computer readable code means, which when run in the network node 110 causes the network node to perform the steps described in any of the described embodiments of the network node. The computer program 605 may be carried by a computer program product connectable to the processor 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the network node 110 has access via the communication unit 602. The computer program may then be downloaded from the server into the memory 604.

Figure 21:
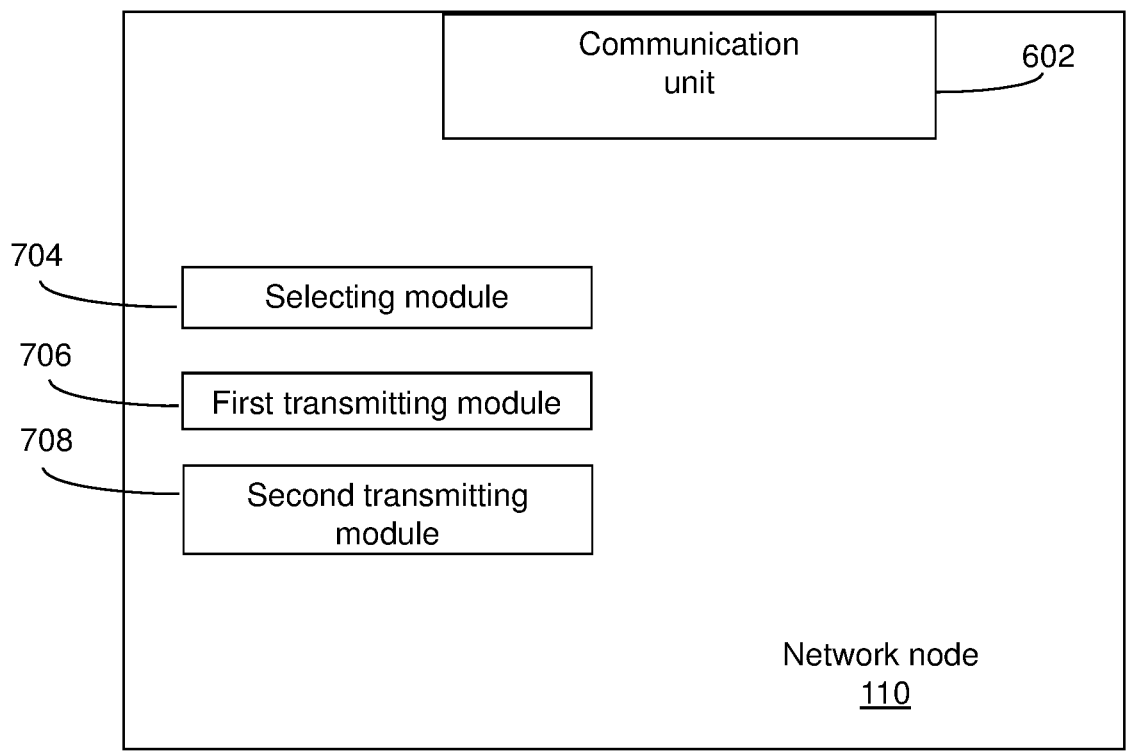

FIG. 21 shows another embodiment of a network node 110 operable in a wireless communication system 100 configured for wireless transmission of signals to wireless communication devices 120, 130. The network node 110 comprises a selection module 704 for selecting an adapted MCS for a first signal to be transmitted to a first wireless communication device 120 at a first frequency bandwidth, the MCS being adapted to that a second signal is to be transmitted to a second wireless communication device 130 concurrently with the first signal, the second signal being transmitted at a second frequency bandwidth that is a subset of the first frequency bandwidth, the second frequency bandwidth being narrower than the first frequency bandwidth. The network node 110 further comprises a first transmitting module 706 for transmitting the first signal to the first wireless communication device 120 at the first frequency bandwidth coded with the adapted MCS, and a second transmitting module 708 for transmitting the second signal to the second wireless communication device 130 at the second frequency bandwidth, the second signal being sent concurrently with the first signal. The network node 110 may further comprise a communication unit 602 similar to the communication unit of FIG. 20.

Figure 22:
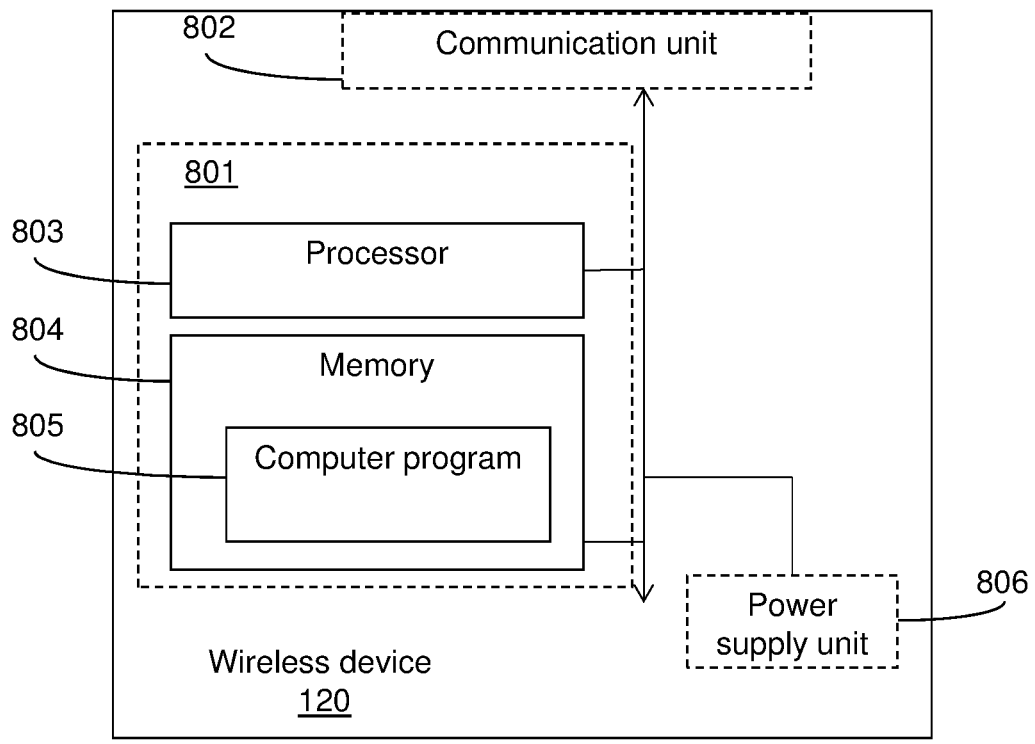
FIGS. 22-23 are block diagrams illustrating a wireless communication device in more detail, according to further possible embodiments.

FIG. 22, in conjunction with FIG. 1, shows a first wireless communication device 120 operable in a wireless communication network 100 configured for wireless reception of signals from a network node 110. The first communication device 120 comprises a processor 803 and a memory 804. The memory contains instructions executable by said processor, whereby the first communication device 120 is operative for receiving, from the network node 110, an indication of an adapted MCS selected for a first signal to be transmitted to the first wireless communication device 120 at a first frequency bandwidth, the MCS being adapted to that a second signal is to be transmitted by the network node to another wireless communication device 130 concurrently with the first signal and at a second frequency bandwidth that is a subset of the first frequency bandwidth, the second frequency bandwidth being narrower than the first bandwidth. The first communication device 120 is further operative for receiving, from the network node, an indication of the subset of the first bandwidth used for sending signals to the second wireless communication device, and receiving the first signal from the network node 110 at the first frequency bandwidth coded with the adapted MCS.

According to an embodiment, the first wireless communication device 120 is further operative for blanking data of the received first signal at the subset of the first bandwidth, in response to the received indication of the subset, and decoding the received, blanked first signal using the indicated adapted MCS.

According to other embodiments, the wireless device 120 may further comprise a communication unit 802, which may be considered to comprise conventional means for wireless communicating from and/or to other nodes in the wireless network 100, such as the network node 110. The communication unit 602 may comprise transmitting units for transmitting wireless signals and receiving units for receiving wireless signals. The instructions executable by said processor 803 may be arranged as a computer program 805 stored e.g. in said memory 804. The processor 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the actions and/or methods mentioned above. The wireless device may further comprise a power supply unit 806, such as a battery, for providing the wireless device with electrical power.

The computer program 805 may comprise computer readable code means, which when run in the wireless device 120 causes the wireless device to perform the steps described in any of the described embodiments of the wireless device.

The computer program 805 may be carried by a computer program product connectable to the processor 803. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the wireless device has access via the communication unit 802. The computer program may then be downloaded from the server into the memory 804.

Figure 23:
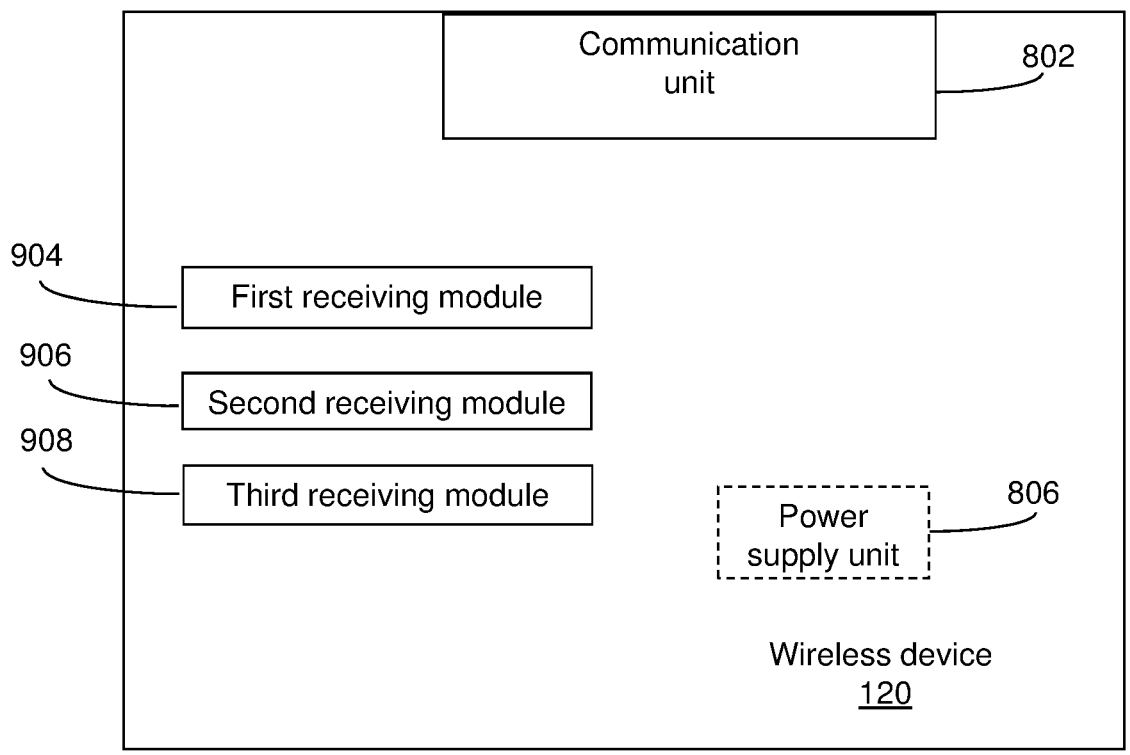

FIG. 23 shows an embodiment of a first wireless communication device 120 operable in a wireless communication network 100 configured for wireless reception of signals from a network node 110. The first communication device 120 comprises a first receiving module 904 for receiving, from the network node 110, an indication of an adapted modulation and coding scheme, MCS, selected for a first signal to be transmitted to the first wireless communication device 120 at a first frequency bandwidth, the MCS being adapted to that a second signal is to be transmitted by the network node to another wireless communication device 130 concurrently with the first signal and at a second frequency bandwidth that is a subset of the first frequency bandwidth, the second frequency bandwidth being narrower than the first bandwidth. The first communication device 120 further comprises a second receiving module 906 for receiving, from the network node, an indication of the subset of the first bandwidth used for sending signals to the second wireless communication device, and a third receiving module 908 for receiving the first signal from the network node 110 at the first frequency bandwidth using the adapted MCS. The first wireless communication device 120 may also comprise a communication unit 802 similar to the communication unit 802 of FIG. 22 as well as a power supply unit 806 similar to the power supply unit of FIG. 22.

At least some of the above described embodiments provide a means for efficient concurrent transmission at very low complexity and in a way that can be made transparent for the receivers. The fact that it can be made transparent for the receivers also makes it suitable to be introduced for systems already deployed in the field as it basically works also with legacy wireless devices. The transmission mode proposed in embodiments of the invention also provides bandwidth protection for the narrowband wireless devices, thus helping to prevent packet collisions with packets originating from legacy broadband wireless devices within the same BSS or in adjacent BSSs.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. More-over, it is not necessary for an apparatus or method to address each and every problem sought to be solved by the presently described concept, for it to be encompassed hereby. In the exemplary figures, a broken line generally means that what is within the broken line is optional.

The invention claimed is:

1. A method performed by a network node of a wireless communication network for wireless transmission of signals to wireless communication devices, the method comprising:
selecting an adapted modulation and coding scheme (MCS) for a first signal to be transmitted to a first wireless communication device at a first frequency bandwidth, the MCS being adapted to a second signal being transmitted to a second wireless communication device concurrently with the first signal, the second signal being transmitted at a second frequency bandwidth that is a subset of the first frequency bandwidth, the second frequency bandwidth being narrower than the first frequency bandwidth, wherein selecting the adapted MCS is based on a percentage of the first frequency bandwidth that the second frequency bandwidth occupies;
sending information to the first wireless communication device indicating that a subset of the first frequency bandwidth is used for sending signals to the second wireless communication device, including an indication of the used subset, wherein, based on the information, the first wireless communication device disregards the information received at the subset of the first frequency bandwidth;
transmitting the first signal to the first wireless communication device at the first frequency bandwidth coded with the adapted MCS; and
transmitting the second signal to the second wireless communication device at the second frequency bandwidth, the second signal being sent concurrently with the first signal.

2. The method according to claim 1, further comprising, before selecting the adapted MCS for the first signal:
selecting an original MCS for the first signal, wherein the original MCS is less robust than the adapted MCS; and
detecting that the second signal is to be transmitted to the second wireless communication device concurrently with the transmission of the first signal,
wherein selecting the adapted MCS for the first signal is performed in response to the detecting.

3. The method according to claim 1, further comprising:
selecting the subset of the first frequency bandwidth to be used for the second frequency bandwidth based on signal strengths in sub-bandwidths of the first frequency bandwidth.

4. The method according to claim 1, wherein the first signal comprises a preamble portion and a data portion, and data of the second signal is overlaid over the data portion of the first signal at the subset of the first bandwidth corresponding to the second bandwidth.

5. The method according to claim 1, wherein:
the first signal comprises a preamble portion and a data portion; and
transmitting the first signal comprises blanking at least the data portion of the first signal at the subset of the first bandwidth corresponding to the second bandwidth.

6. A non-transitory, computer-readable medium storing computer-executable instructions that, when executed by a processor, cause the processor to carry out the method according to claim 1.

7. A method performed by a first wireless communication device of a wireless communication network for wireless reception of signals from a network node, the method comprising:
receiving, from the network node, an indication of an adapted modulation and coding scheme (MCS) selected for a first signal to be transmitted to the first wireless communication device at a first frequency bandwidth, the MCS being adapted to a second signal being transmitted by the network node to another wireless communication device concurrently with the first signal and at a second frequency bandwidth that is a subset of the first frequency bandwidth, the second frequency bandwidth being narrower than the first bandwidth, wherein the selection of adapted MCS is based on a percentage of the first frequency bandwidth that the second frequency bandwidth occupies;
receiving, from the network node, an indication of the subset of the first bandwidth used for sending signals to the second wireless communication device;
receiving the first signal from the network node at the first frequency bandwidth using the adapted MCS;
blanking data of the received first signal at the subset of the first bandwidth, in response to the received indication of the subset; and
decoding the received, blanked first signal using the indicated adapted MCS.

8. A non-transitory, computer-readable medium storing computer-executable instructions that, when executed by a processor, cause the processor to carry out the method according to claim 7.

9. A network node operable in a wireless communication system configured for wireless transmission of signals to wireless communication devices, the network node comprising a processor and a memory, said memory containing instructions that, when executed by said processor, configure the network node to:
select an adapted modulation and coding scheme (MCS) for a first signal to be transmitted to a first wireless communication device at a first frequency bandwidth, the MCS being adapted to a second signal being transmitted to a second wireless communication device concurrently with the first signal, the second signal being transmitted at a second frequency bandwidth that is a subset of the first frequency bandwidth, the second frequency bandwidth being narrower than the first frequency bandwidth, wherein execution of the instructions further configures the network node to select the adapted MCS based on a percentage of the first frequency bandwidth that the second frequency bandwidth occupies;
send information to the first wireless communication device indicating that a subset of the first frequency bandwidth is used for sending signals to the second wireless communication device, including an indication of the used subset, wherein, based on the information, the first wireless communication device disregards the information received at the subset of the first frequency bandwidth;
transmit the first signal to the first wireless communication device at the first frequency bandwidth coded with the adapted MCS; and
transmit the second signal to the second wireless communication device at the second frequency bandwidth, the second signal being sent concurrently with the first signal.

10. The network node according to claim 9, wherein execution of the instructions further configures the network node to:
before selecting the adapted MCS for the first signal:
select an original MCS for the first signal, the original MCS being less robust than the adapted MCS; and
detect that the second signal is to be transmitted to the second wireless communication device concurrently with the transmission of the first signal;
select the adapted MCS for the first signal in response to the detecting.

11. The network node according to claim 9, wherein execution of the instructions further configures the network node to:
select the subset of the first frequency bandwidth to be used for the second frequency bandwidth based on signal strengths on sub-bandwidths of the first frequency bandwidth.

12. The network node according to claim 9, wherein the first signal comprises a preamble portion and a data portion, and data of the second signal is overlaid over the data portion of the first signal at the subset of the first bandwidth corresponding to the second bandwidth.

13. The network node according to claim 9, wherein:
the first signal comprises a preamble portion and a data portion; and
execution of the instructions further configures the network node to transmit the first signal by blanking at least the data portion of the first signal at the subset of the first bandwidth corresponding to the second bandwidth.

14. A first wireless communication device operable in a wireless communication network configured for wireless reception of signals from a network node, the first communication device comprising a processor and a memory, said memory containing instructions that, when executed by said processor, configure the first wireless communication device to:
receive, from the network node, an indication of an adapted modulation and coding scheme (MCS) selected for a first signal to be transmitted to the first wireless communication device at a first frequency bandwidth, the MCS being adapted to a second signal being transmitted by the network node to another wireless communication device concurrently with the first signal and at a second frequency bandwidth that is a subset of the first frequency bandwidth, the second frequency bandwidth being narrower than the first bandwidth, wherein the selection of adapted MCS is based on a percentage of the first frequency bandwidth that the second frequency bandwidth occupies;
receive, from the network node, an indication of the subset of the first bandwidth used for sending signals to the second wireless communication device;
receive the first signal from the network node at the first frequency bandwidth using the adapted MCS;
blank data of the received first signal at the subset of the first bandwidth, in response to the received indication of the subset; and
decode the received, blanked first signal using the indicated adapted MCS.

\* \* \* \* \*